(12) United States Patent
Matsuno

(10) Patent No.: US 12,172,689 B2
(45) Date of Patent: Dec. 24, 2024

(54) CART

(71) Applicant: MAKITA CORPORATION, Anjo (JP)

(72) Inventor: Tadasuke Matsuno, Anjo (JP)

(73) Assignee: MAKITA CORPORATION, Anjo (JP)

( * ) Notice: Subject to any disclaimer, the term of this patent is extended or adjusted under 35 U.S.C. 154(b) by 357 days.

(21) Appl. No.: 17/863,891

(22) Filed: Jul. 13, 2022

(65) Prior Publication Data

US 2023/0017430 A1 Jan. 19, 2023

(30) Foreign Application Priority Data

Jul. 15, 2021 (JP) ................... 2021-117160

(51) Int. Cl.
*B62B 3/00* (2006.01)

(52) U.S. Cl.
CPC .......... *B62B 3/001* (2013.01); *B62B 2301/00* (2013.01)

(58) Field of Classification Search
CPC ........ B62B 3/001; B62D 5/04; B62D 5/0403; B62D 5/0409; B62D 5/0421; B62D 5/0463
See application file for complete search history.

(56) References Cited

U.S. PATENT DOCUMENTS

| | | | | |
|---|---|---|---|---|
| 5,044,043 A * | 9/1991 | Basham | ............... | B62D 51/002 15/98 |
| 7,174,093 B2 * | 2/2007 | Kidd | ...................... | A61G 5/047 310/67 R |
| 7,182,169 B2 * | 2/2007 | Suzuki | ..................... | B62D 1/16 180/908 |
| 7,497,299 B2 * | 3/2009 | Kobayashi | ........... | B62D 25/145 180/444 |
| 7,497,471 B2 * | 3/2009 | Kobayashi | ........... | B62D 5/0406 180/311 |
| 7,665,571 B2 * | 2/2010 | Kobayashi | ........... | B62D 5/0409 180/444 |
| 7,950,486 B2 * | 5/2011 | Van Bronkhorst | .. | B60G 17/021 180/89.11 |
| 7,958,964 B2 * | 6/2011 | Kobayashi | ........... | B62D 5/0409 180/443 |
| 9,145,163 B2 * | 9/2015 | Castaneda | ................ | B62D 1/14 |

(Continued)

FOREIGN PATENT DOCUMENTS

JP 2006-044621 A 2/2006

*Primary Examiner* — Jeffrey J Restifo
(74) *Attorney, Agent, or Firm* — Sughrue Mion, PLLC

(57) ABSTRACT

A cart may include: a carriage; a wheel supported by the carriage and touching ground; a holding member rotatably supported by the carriage about a steering axis and rotatably supporting the wheel about a rotation axis; a steering handle to be gripped by a user; an input sensor configured to detect an operation on the steering handle by the user; a steering motor configured to be actuated in response to the operation by the user detected by the input sensor; and a transmission mechanism connecting the steering motor and the holding member and configured to rotate the holding member about the steering axis in response to actuation of the steering motor. The steering handle and the transmission mechanism may be mechanically separated, and the transmission mechanism may include a torque limiter interposed between the steering motor and the holding member.

6 Claims, 33 Drawing Sheets

(56) References Cited

U.S. PATENT DOCUMENTS

| | | | | |
|---|---|---|---|---|
| 11,173,781 | B2* | 11/2021 | Mock | B60K 17/046 |
| 11,331,991 | B2* | 5/2022 | McGrew, Jr. | F16H 3/64 |
| 11,865,924 | B2* | 1/2024 | Umemoto | B60L 1/02 |
| 11,873,020 | B2* | 1/2024 | Kalinowski | B62B 5/063 |
| 11,897,339 | B2* | 2/2024 | Shima | B62B 5/0036 |
| 2005/0257989 | A1* | 11/2005 | Iwami | B62D 5/0409 |
| | | | | 180/443 |
| 2021/0229721 | A1* | 7/2021 | Lee | B62B 3/001 |
| 2023/0013915 | A1* | 1/2023 | Umemoto | B60L 15/30 |
| 2023/0015530 | A1* | 1/2023 | Matsuno | B62B 5/004 |
| 2023/0017430 | A1* | 1/2023 | Matsuno | B62B 5/0043 |
| 2023/0026990 | A1* | 1/2023 | Umemoto | B62B 5/0033 |
| 2023/0125809 | A1* | 4/2023 | Izadi | B62B 5/0033 |
| | | | | 180/19.1 |
| 2023/0294523 | A1* | 9/2023 | Takeda | B62B 3/12 |
| | | | | 180/65.1 |

\* cited by examiner

FIG. 11
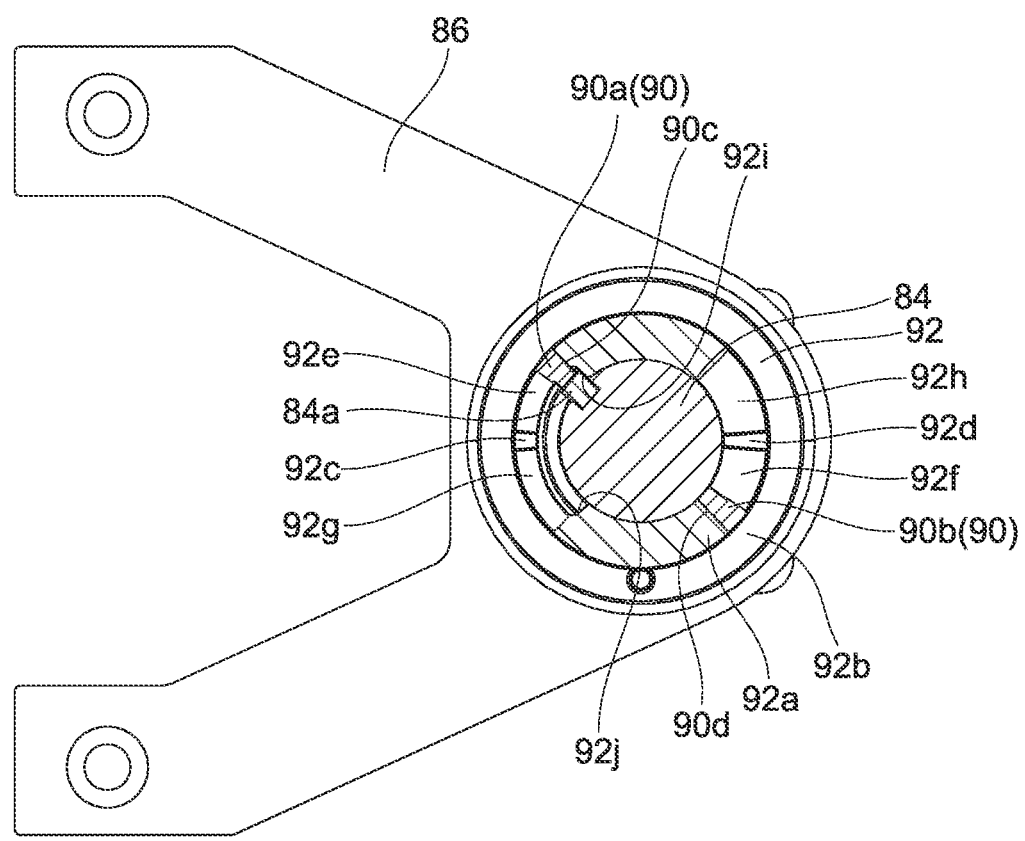
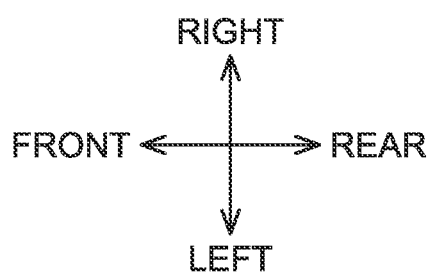

CART

CROSS-REFERENCE TO RELATED APPLICATION

This application claims priority to Japanese patent application No. 2021-117160, riled on Jul. 15, 2021, the entire contents of which are incorporated herein by reference.

TECHNICAL FIELD

The art disclosed herein relates to a cart.

BACKGROUND

Japanese Patent Application Publication No. 2006-44621 describes a vehicle. This vehicle includes: a carriage; a wheel supported by the carriage and touching ground; a holding member rotatably supported by the carriage about a steering axis and rotatably supporting the wheel about a rotation axis; a steering handle to be gripped by a user; an input sensor configured to detect an operation on the steering handle by the user; a steering motor configured to be actuated in response to the operation by the user detected by the input sensor; and a transmission mechanism connecting the steering motor and the holding member and configured to rotate the holding member about the steering axis in response to actuation of the steering motor. The steering handle and the transmission mechanism are mechanically separated.

SUMMARY

When a vehicle as above is used as a can for carrying luggage, there is a risk that the transmission mechanism breaks when an overload is applied from the steering motor. The disclosure herein provides art, in a cart, to suppress a transmission mechanism from breaking even when an overload is applied from a steering motor.

In one or more embodiments, a cart may comprise: a carriage; a wheel supported by the carriage anti touching ground; a holding member rotatably supported by the carriage about a steering axis and rotatably supporting the wheel about a rotation axis, a steering handle to be gripped by a user; an input sensor configured to detect an operation on the steering handle by the user; a steering motor configured to be actuated in response to the operation by the user detected by the input sensor; and a transmission mechanism connecting the steering motor and the holding member and configured to rotate the holding member about the steering axis in response to actuation of the steering motor. The steering handle and the transmission mechanism may be mechanically separated. The transmission mechanism may include a torque limiter interposed between the steering motor and the holding member.

According to the above configuration, since the transmission mechanism includes the torque limiter interposed between the steering motor and the holding member, the transmission mechanism can be suppressed from breaking even when an overload is applied from the steering motor.

BRIEF DESCRIPTION OF DRAWINGS

FIG. 11 is a cross-sectional view of a lower portion of the handle unit 8 of the embodiment in a cross section along the front-rear and left-right directions in the state in which an operation to steer the handle unit 8 to the right is performed.

DETAILED DESCRIPTION

Figure 1:
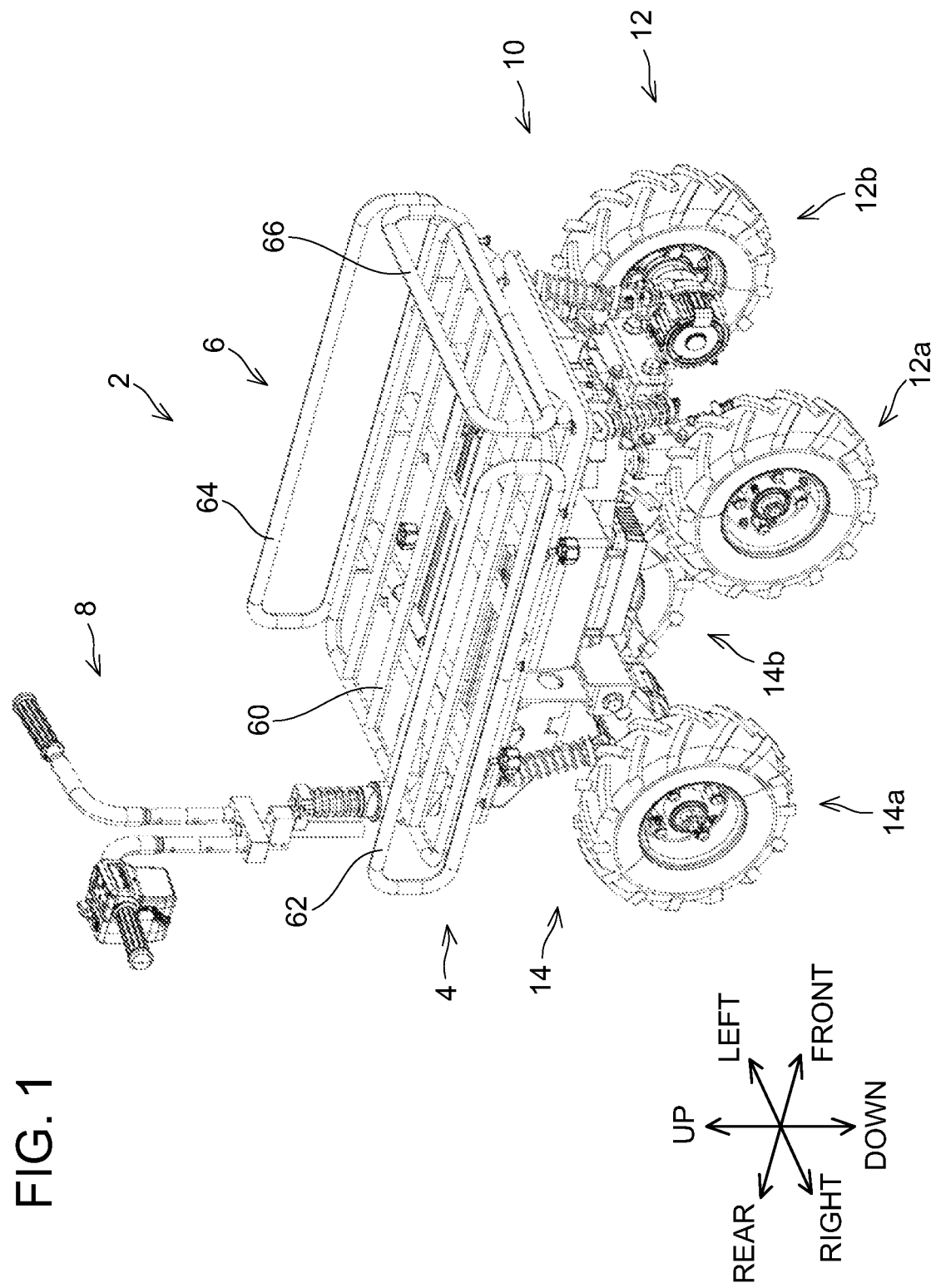
FIG. 1 is a perspective view of a cart 2 of an embodiment viewed from the front right upper side.

Representative, non-limiting examples of the present disclosure will now be described in further detail with reference to the attached drawings. This detailed description is merely intended to teach a person of skill in the an further details for practicing aspects of the present teachings and is not intended to limit the scope of the present disclosure. Furthermore, each of the additional features and teachings disclosed below may be utilized separately or in conjunction with other features and teachings to provide improved carts, as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each oilier for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

In one or more embodiments, a cart may comprise: a carriage; a wheel supported by the carriage and touching ground; a holding member rotatably supported by the carriage about a steering axis and rotatably supporting the wheel about a rotation axis; a steering handle to be gripped by a user; an input sensor configured to detect an operation on the steering handle by the user; a steering motor configured to be actuated in response to the operation by the user detected by the input sensor; and a transmission mechanism connecting the steering motor and the bolding member and configured to rotate the holding member about the steering axis in response to actuation of the steering motor. The steering handle and the transmission mechanism may be mechanically separated. The transmission mechanism may include a torque limiter interposed between the steering motor and the holding member.

According to the above configuration, since the transmission mechanism includes the torque limiter interposed between the steering motor and the holding member, the transmission mechanism can be suppressed from breaking, even when an overload is applied from the steering motor.

In one or more embodiments, the transmission mechanism may further include a steering angle sensor arranged between the steering motor and the holding member and configured to detect a steering angle in the transmission mechanism. The torque limiter may be arranged between the steering motor and the steering angle sensor.

According to the above configuration, since the torque limiter is interposed between the steering motor and the steering angle sensor, a difference between a steering angle detected using the steering angle sensor and an actual steering angle in the transmission mechanism can be reduced even when transmission of power in the transmission, mechanism is blocked due to actuation of the torque limiter.

In one or more embodiments, the transmission mechanism may further include: a steering shaft configured to rotate with respect to the carriage and configured to rotate in response to the actuation of the steering motor; a link member fixed to the steering shaft; and a tie rod including one end rotatably attached to the link member and the other end rotatably attached to the holding member. The steering angle sensor may be arranged between the steering motor and the steering shaft.

According to the above configuration, the torque limiter and the steering angle sensor can be arranged at positions away from the wheel and the holding member.

In one or more embodiments, the transmission mechanism may further include a relay shaft configured to rotate with respect to the carriage and interposed between the steering motor and the steering shaft. The relay shaft may include a first gear portion. The steering shaft may include a second gear portion meshing with the first gear portion. The steering angle sensor may be attached to the relay shaft.

According to the above configuration, steering angle detection by the steering angle sensor can be performed with higher precision.

In one or more embodiments, the transmission mechanism may further include a spindle configured to rotate with respect to the carriage and configured to rotate in response to the actuation of the steering motor. The spindle may include a cylindrical worm part. The relay shaft may further include a worm wheel part meshing with the cylindrical worm part.

According to the above configuration, rotation is transmitted from the spindle to the relay shaft although it is not transmitted from the relay shaft to the spindle. For example, even when the holding member receives torque about the steering axis due to an external force, this torque can be suppressed from being transmitted to the steering motor through the transmission mechanism.

In one or more embodiments, the steering motor may include a motor shaft configured to rotate in response to the actuation of the steering motor. The motor shaft may include a third gear portion. The torque limiter may include: a cam wheel fixed to the spindle; a movable gear configured to move with respect to the spindle along an axial direction of the spindle and meshing with the third gear portion; and a coil spring configured to bias the movable gear with respect to the spindle toward the cam wheel. The cam wheel may include a cam groove. The movable gear may include a cam protrusion corresponding to the cam groove.

According to the above configuration, the torque limiter can be realized with a simple configuration.

Embodiment

A cart 2 shown in FIG. 1 comprises a carriage unit 4, a luggage carrier unit 6, a handle unit 8, a steering unit 10, a front wheel unit 12, and a rear wheel unit 14. The cart 2 is configured to carry luggage placed on the luggage carrier unit 6. The cart 2 includes a receiver (not shown) incorporated in the carriage unit 4. The cart 2 is configured to operate in a manual mode of moving forward or backward in the state in which a user standing behind the handle unit 8 is gripping the handle unit 8. Alternatively, the cart 2 may operate in an automatic mode of executing a tracking operation of moving by following a beacon (not shown) which the user standing in front of the carriage unit 4 is carrying or executing a remote-controlled operation of moving in accordance with instructions from a remote controller (not shown) which the user carries. In this case, the cart 2 is configured to receive radio waves from the beacon or the remote controller using its receiver. Alternatively, the cart 2 may operate in a parking mode of locking the rear wheel unit 14 and staying immobile.

(Carriage Unit 4)

Figure 2:
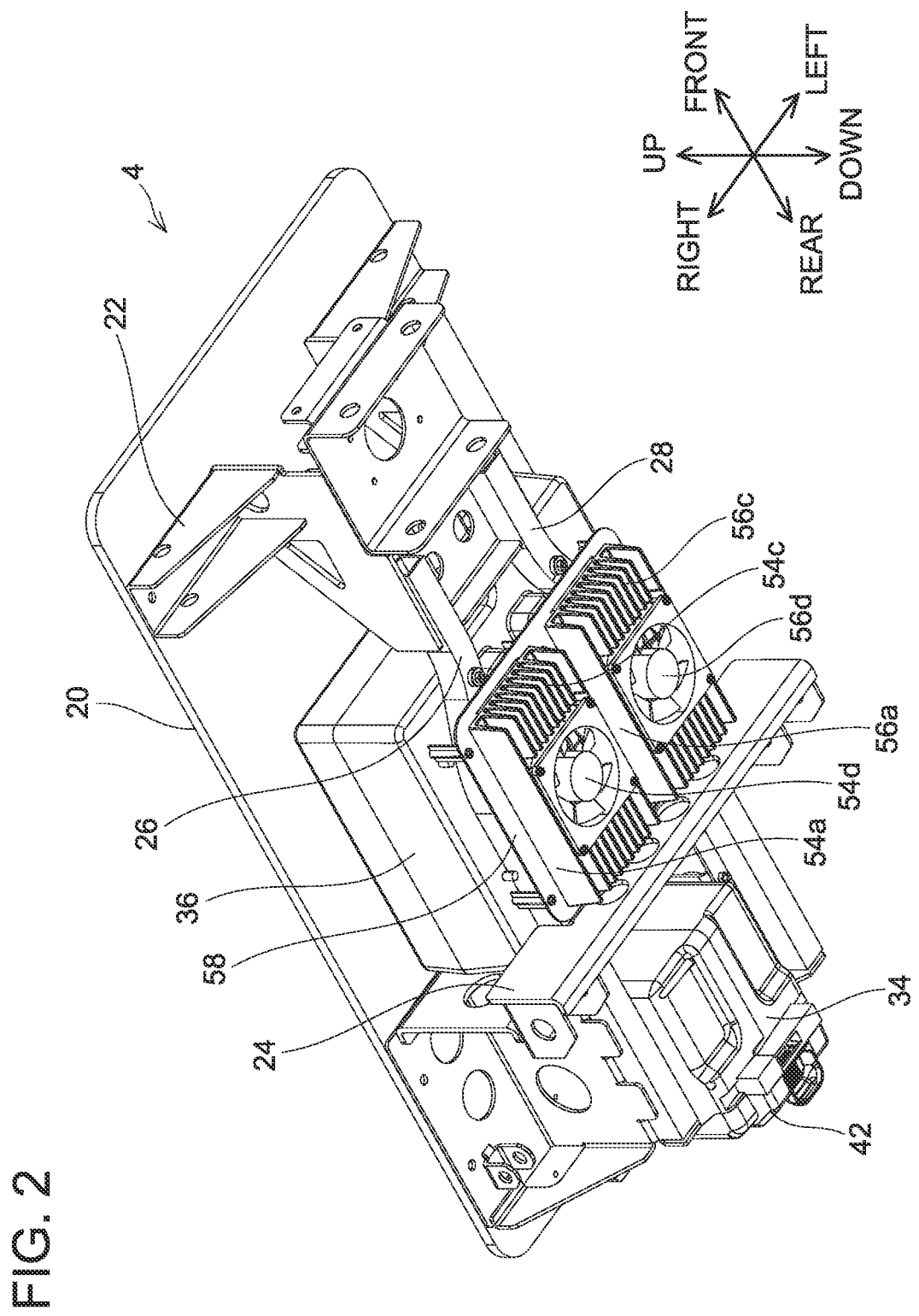
FIG. 2 is a perspective view of a carriage unit 4 of the embodiment viewed from the from right lower side.
Figure 3:
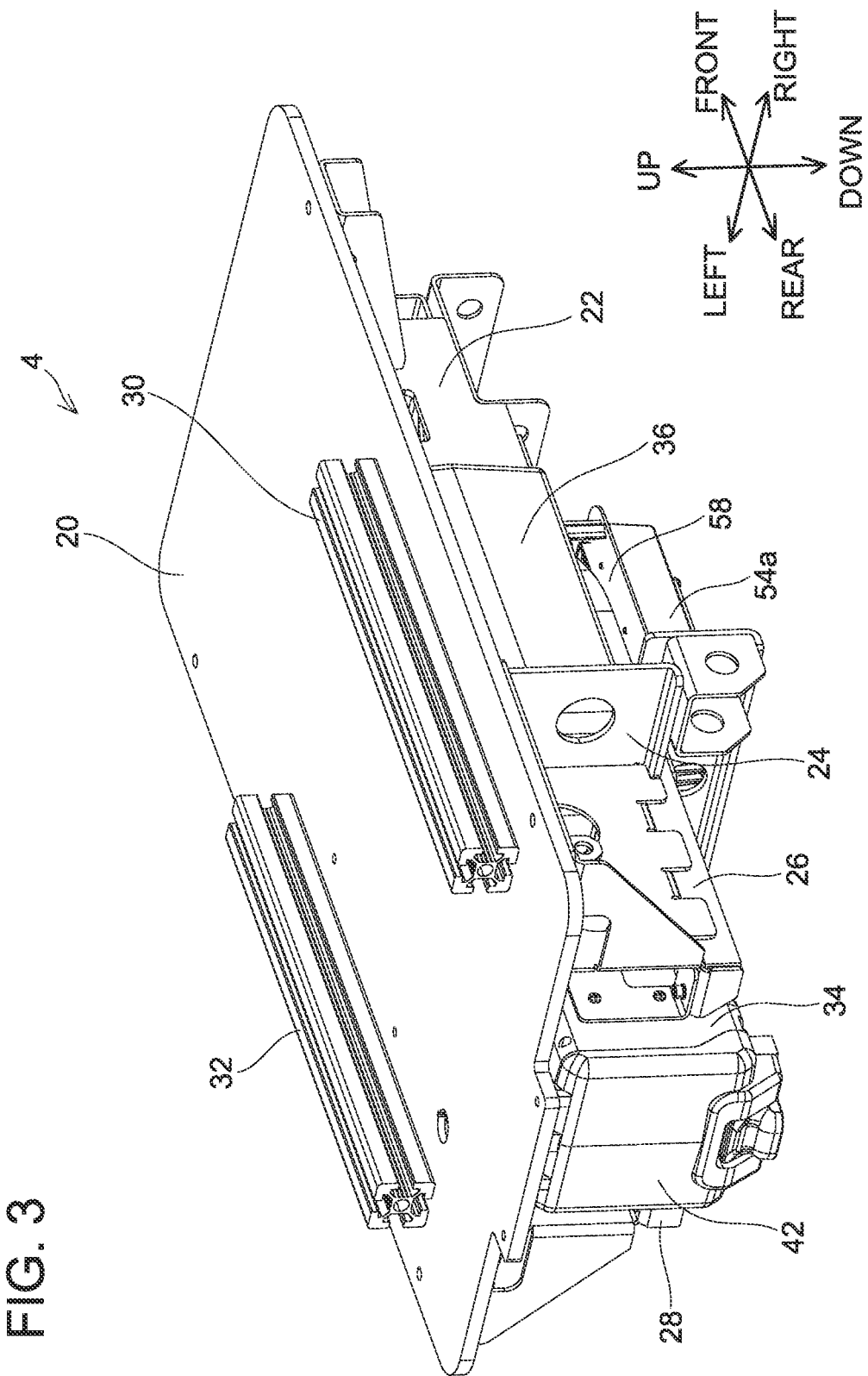
FIG. 3 is a perspective view of the carriage unit 4 of the embodiment viewed from the tear right upper side.

As shown in FIGS. 2 and 3, the carriage unit 4 comprises a base plate 20, a front support member 22, a rear support member 24, a right lower frame 26, a left lower frame 28, a right upper frame 30, a left upper frame 32, a battery box 34, and a controller casing 36. The base plate 20 is a member constituted of aluminum and has a substantially rectangular flat plate shape with its longitudinal direction extending along a front-rear direction and its short direction extending along a left-right direction. As shown in FIG. 2, the front support member 22 is a member constituted of steel and is fixed to a lower surface of the base plate 20 at a front portion of the base plate 20. The rear support member 24 is a member constituted of steel and is fixed to the lower surface of the base plate 20 at n rear portion of the base plate 20. The right lower frame 26 and the left lower frame 28 are both members constituted of steel and extend in the front-rear direction below the base plate 20. A front portion of the right lower frame 26 and a front portion of the left lower frame 28 are fixed to the front support member 22. A rear portion of the right lower frame 26 and a rear portion of the left lower frame 28 are fixed to the rear support member 24. As shown in FIG. 3, the right upper frame 30 and the left upper frame 32 are both members constituted of aluminum and extend in the front-rear direction on or above the base plate 20. The right upper frame 30 and the left upper frame 32 are fixed to an upper surface of the base plate 20.

Figure 4:
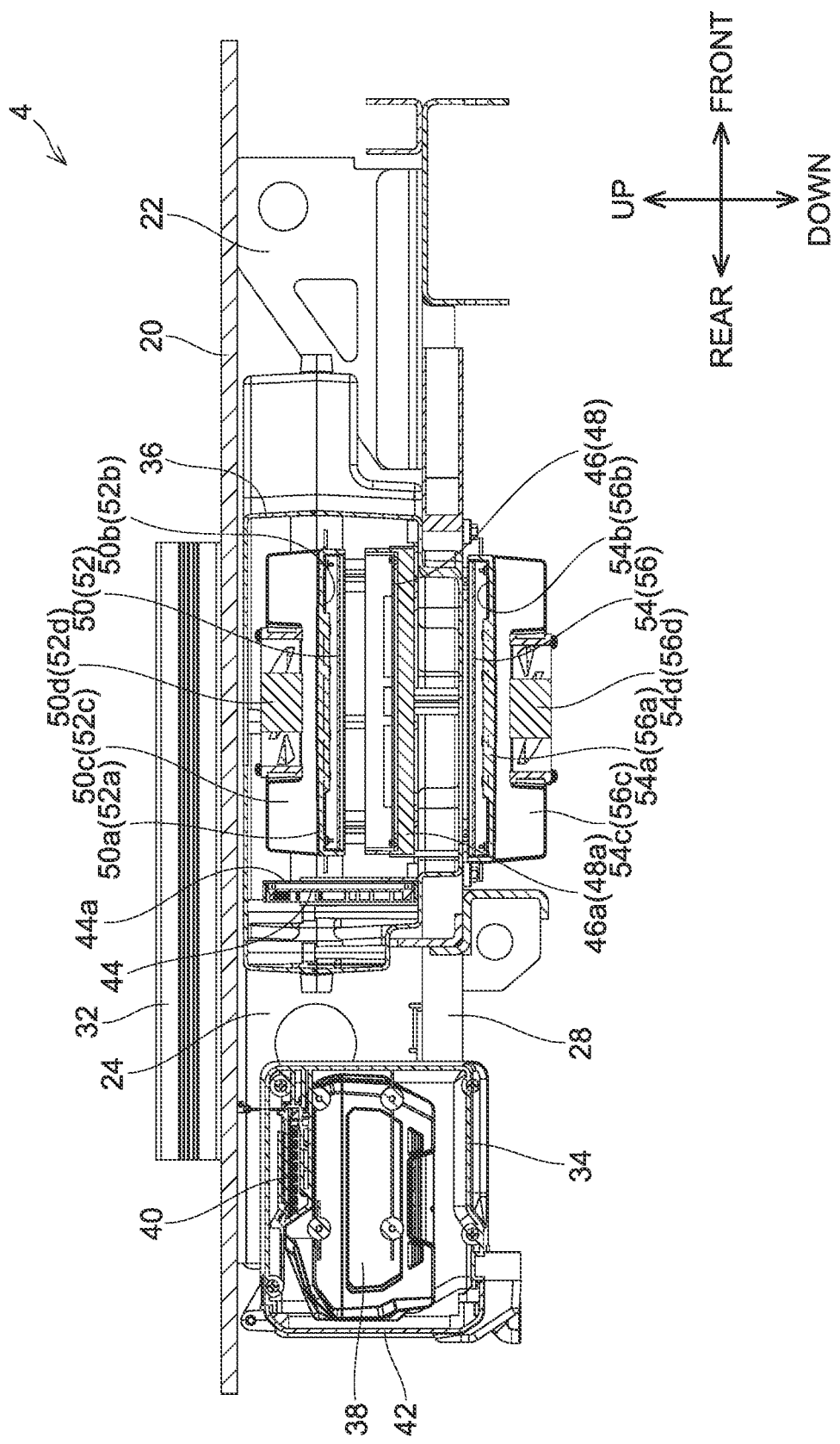
FIG. 4 is a cross-sectional view of the carriage unit 4 of the embodiment in a cross section along front-rear and up-down directions.

As shown in FIG. 3, the battery box 34 is a member constituted of resin and is arranged on or below the base plate 20 in the vicinity of the rear portion of the base plate 20. The battery box 34 is fixed to the rear support member 24. As shown in FIG. 4, battery receptacle 40 to which a battery pack 38 can be detachably attached is arranged inside the battery box 34. The battery pack 38 includes secondary battery cells such as lithium ion battery cells. The cart 2 is configured to operate by power supplied from the battery pack 38 attached to the battery receptacle 40. An openable battery cover 42 is arranged at a rear portion of the battery box 34. The battery pack 38 can be attached to or detached from the battery receptacle 40 by sliding the battery pack 38 in the front-rear direction with respect to the battery receptacle 40 with the battery cover 42 opened.

Figure 5:
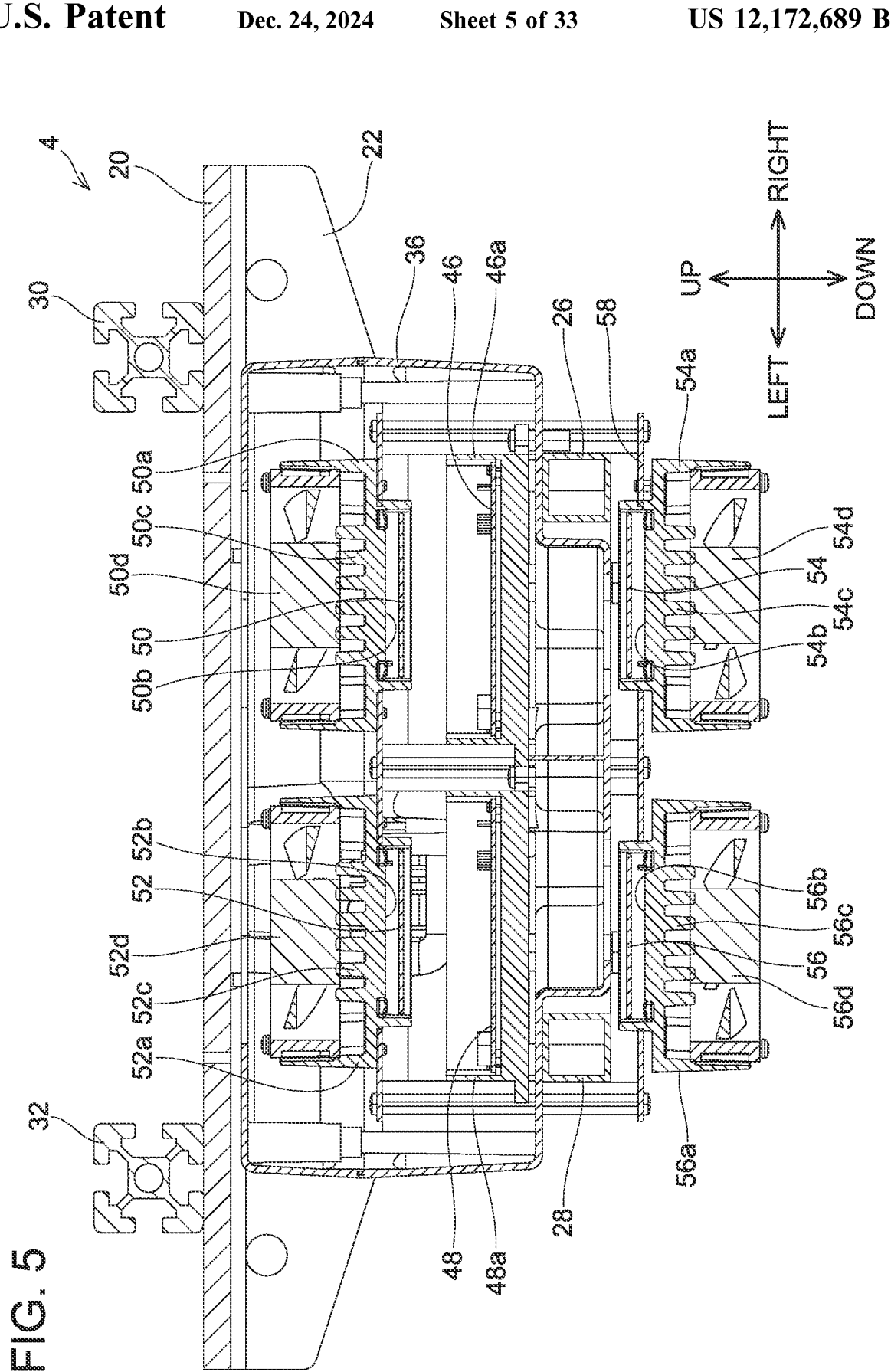
FIG. 5 is a cross-sectional view of the carriage unit 4 of the embodiment in a cross section along left-right and up-down directions.

As shown in FIG. 2, the controller casing 36 is a member constituted of resin, and is arranged on or below the base plate 20 in the vicinity of the center of the base plate 20. The controller casing 36 is fixed to the right lower frame 26 and the left lower frame 28 with the controller casing 36 placed on an upper surface of the right lower frame 26 and an upper surface of the left lower frame 28. As shown in FIGS. 4 and 5, the controller casing 36 holds one main control circuit board 44, two drive control circuit boards 46, 48, and four electrical brake circuit boards 50, 52, 54, 56.

As shown in FIG. 4, the main control circuit board 44 is housed in a circuit board casing 44a. The circuit board casing 44a is housed on the back side within the controller casing 36. The circuit board casing 44a is arranged such that the main control circuit board 44 is arranged along an up-down direction and the left-right direction. Circuits for controlling operations of the cart 2 are mounted on the main control circuit board 44.

As shown in FIG. 5, the drive control circuit boards 46, 48 are respectively housed inside circuit board casings 46a, 48a. As shown in FIG. 4, the circuit board casings 46a, 48a are housed on the front lower side within the controller casing 36. The circuit board casings 46a, 48a are arranged such that the drive control circuit boards 46, 48 are arranged along the front-rear direction and the left-right direction. The drive control circuit boards 46, 48 are electrically connected to the main control circuit board 44. Operations of the drive control circuit boards 46, 48 are controlled by the main control circuit board 44. Circuits for controlling operations of a steering motor 176, a right front wheel motor 232, a left front wheel motor 242, a right rear wheel motor, a left rear wheel motor, a right rear wheel electromagnetic brake, and a left rear wheel electromagnetic brake to be described later are mounted on the drive control circuit boards 46, 48.

As shown in FIG. 5, the electrical brake circuit boards 50, 52, 54, 56 are respectively mounted on heat dissipating casings 50a, 52a, 54a, 56a. The heat dissipating casings 50a, 52a, 54a, 56a respectively include circuit board housings 50b, 52b, 54b, 56b housing the electrical brake circuit boards 50, 52, 54, 56, heat dissipating fins 50c, 52c, 54c, 56c, and cooling fans 50d, 52d, 54d, 56d. The heat dissipating casings 50a, 52a are housed at a front upper portion within the controller casing 36. The heat dissipating casing 50a, 52a are arranged such that the electrical brake circuit boards 50, 52 are arranged along the front-rear direction and the left-right direction and the cooling fans 50d, 52d are oriented upward. The heat dissipating casings 54a, 56a are fixed to a heat dissipating plate 58 fixed to the controller casing 36 on the outer side of and at a front lower portion of the controller casing 36. The heat dissipating casings 54a, 56a are arranged such that the electrical brake circuit boards 54, 56 are arranged along the front-rear direction and the left-right direction and the cooling faro 54d. 56d are oriented downward. The electrical brake circuit boards 50, 54 and the cooling fans 50d, 54d are electrically connected to the drive control circuit board 46. Operations of the electrical brake circuit boards 50, 54 and the cooling fans 50d, 54d are controlled by the drive control circuit board 46. The electrical brake circuit boards 52, 56 and the cooling fans 52d, 56d are electrically connected to the drive control circuit board 48. Operations of the electrical brake circuit boards 52, 56 and the cooling fans 52d, 56d are controlled by the drive control circuit board 48. Circuits for applying electric brakes on the right front wheel motor 232, the left front wheel motor 242, the right rear wheel motor, and the left rear wheel motor to be described later are mounted respectively on the electrical brake circuit boards 50, 52, 54, 56.

(Luggage Carrier Unit 6)

As shown in FIG. 1, the luggage carrier unit 6 includes a main frame 60, a right guard 62, a left guard 64, and a front guard 66. The main frame 60, the right guard 62, the left guard 64, and the from guard 66 are constituted of round steel pipes. The main frame 60 is arranged on or above the base plate 20 of the carriage unit 4 and along the front-rear direction and the left-tight direction. The main frame 60 is fixed to the right upper frame 30 and the left upper frame 32 with the main frame 60 placed on upper surfaces of the right upper frame 30 and the left upper frame 32 of the carriage unit 4. Luggage to be carried by the cart 2 is to be placed on an upper surface of the main frame 60. The right guard 62 is attached to the right end of the main frame 60 such that it protrudes higher than the upper surface of the main frame 60. The right guard 62 is arranged along the front-rear direction and the up-down direction. The left guard 64 is attached to the left end of the main frame 60 such that it protrudes higher than the upper surface of the main frame 60. The left guard 64 is arranged along the front-rear direction and the up-down direction. The front guard 66 is attached to the front end of the main frame 60 such dial it protrudes higher than the upper surface of the main frame 60. The front guard 66 is arranged along the left-right direction and the up-down direction.

(Handle Unit 8)

Figure 6:
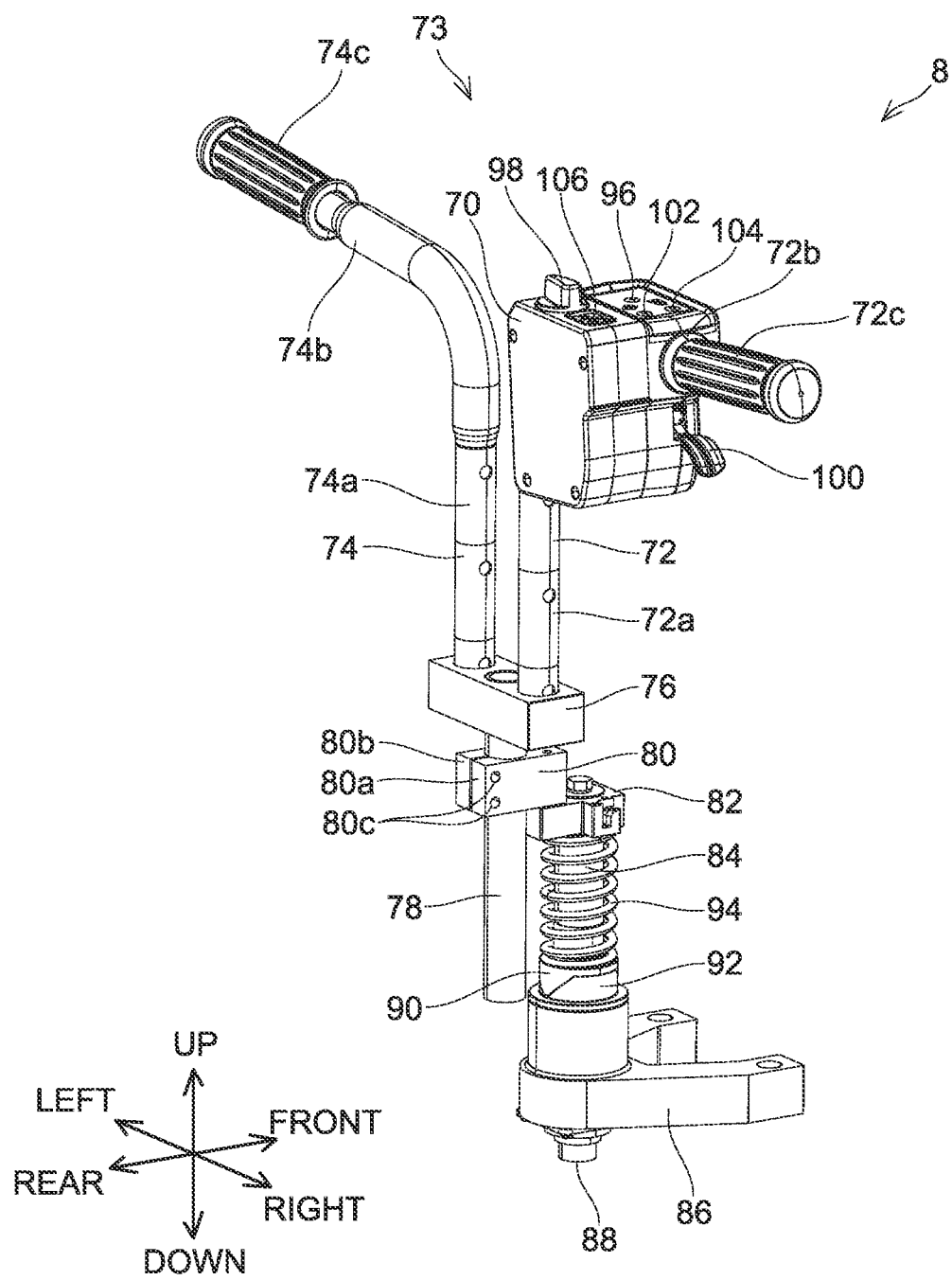
FIG. 6 is a perspective view of a handle unit 8 of the embodiment viewed from the rear right upper side.

As shown in FIG. 6, the handle unit 8 includes a switch box 70, a right handle 72, a left handle 74, a handle arm 76, a support pipe 78, a clamping member 80, a fixed member 82, a handle shaft 84, a base member 86, a rotation angle sensor 88, a movable cam member 90, a fixed cam member 92, and a coil spring 94. Hereinbelow, the right handle 72, the left handle 74, the handle arm 76, and the support pipe 78 may collectively be termed a steering handle 73.

The switch box 70 includes a main power switch 96, a mode shifter switch 98, a trigger switch 100, a travelling direction shifter switch 102, a speed shifter swatch 104, and a horn switch 106. The main power switch 96 is configured to switch main power of the cart 2 between on and oft. The mode shifter switch 98 is configured to switch an operation mode of the cart 2 between the manual mode, the automatic mode, and the parking mode. The trigger switch 100 is configured to switch on/off of a forward motion and a backward motion of the cart 2 and to adjust a travelling speed of the cart 2 in the manual mode. The travelling direction shifter switch 102 is configured to switch a travelling direction of the carl 2 in the manual mode. The speed shifter switch 104 is configured to switch a travelling speed of the cart 2 in the manual mode. The horn switch 106 is configured to sound a horn using a buzzer (not shown) incorporated in the switch box 70. The main power switch 96, the mode shifter switch 98, the trigger switch 100, the travelling direction shifter switch 102, the speed shifter switch 104, the horn switch 106, and the buzzer are electrically connected to the main control circuit board 44 (see FIG. 4).

The right handle 72 includes a support portion 72a extending in the up-down direction and a handle portion 72b that is bent rightward from the upper end of the support portion 72a. The lower end of the support portion 72a is fixed to the handle arm 76. A right grip 72c is arranged at the right end of the handle portion 72b. The switch box 70 is fixed to the handle portion 72b on the left side of the right grip 72c. The left handle 74 includes a support portion 74a extending in the up-down direction and a handle portion 74b that is bent leftward from the upper end of the support portion 74a. The lower end of the support portion 74a is fixed to the handle arm 76. A left grip 74c is arranged at the left end of the handle portion 74b. The upper end of the support pipe 78 is fixed to the handle arm 76. The support pipe 78 extends in the up-down direction. The clamping member 80 includes clamping parts 80a, 80b configured to clamp the support pipe 78 from both left and right sides. A tightening part 80c that is to be tightened by a tightening tool (not shown) is arranged at the rear ends of the clamping parts 80a, 80b. When the tightening tool of the tightening part 80c is tightened, the clamping parts 80a, 80b are firmly pressed against an outer surface of the support pipe 78, and the support pipe 78 is thereby fixed with respect to the clamping member 80. When the tightening tool of the tightening part 80c is loosened, the clamping parts 80a, 80b are no longer pressed against the outer surface of the support pipe 78, and the support pipe 78 thereby becomes movable in the up-down direction with respect to the clamping member 80, and also rotatable about the up-down direction. A position and an angle of the support pipe 78 with respect to the clamping member 80 can be fixed by adjusting the support pipe 78 to a desired position and angle with respect to the clamping member 80 with the tightening tool of the tightening part 80c loosened and thereafter tightening the tightening tool of the tightening part 80c.

Figure 7:
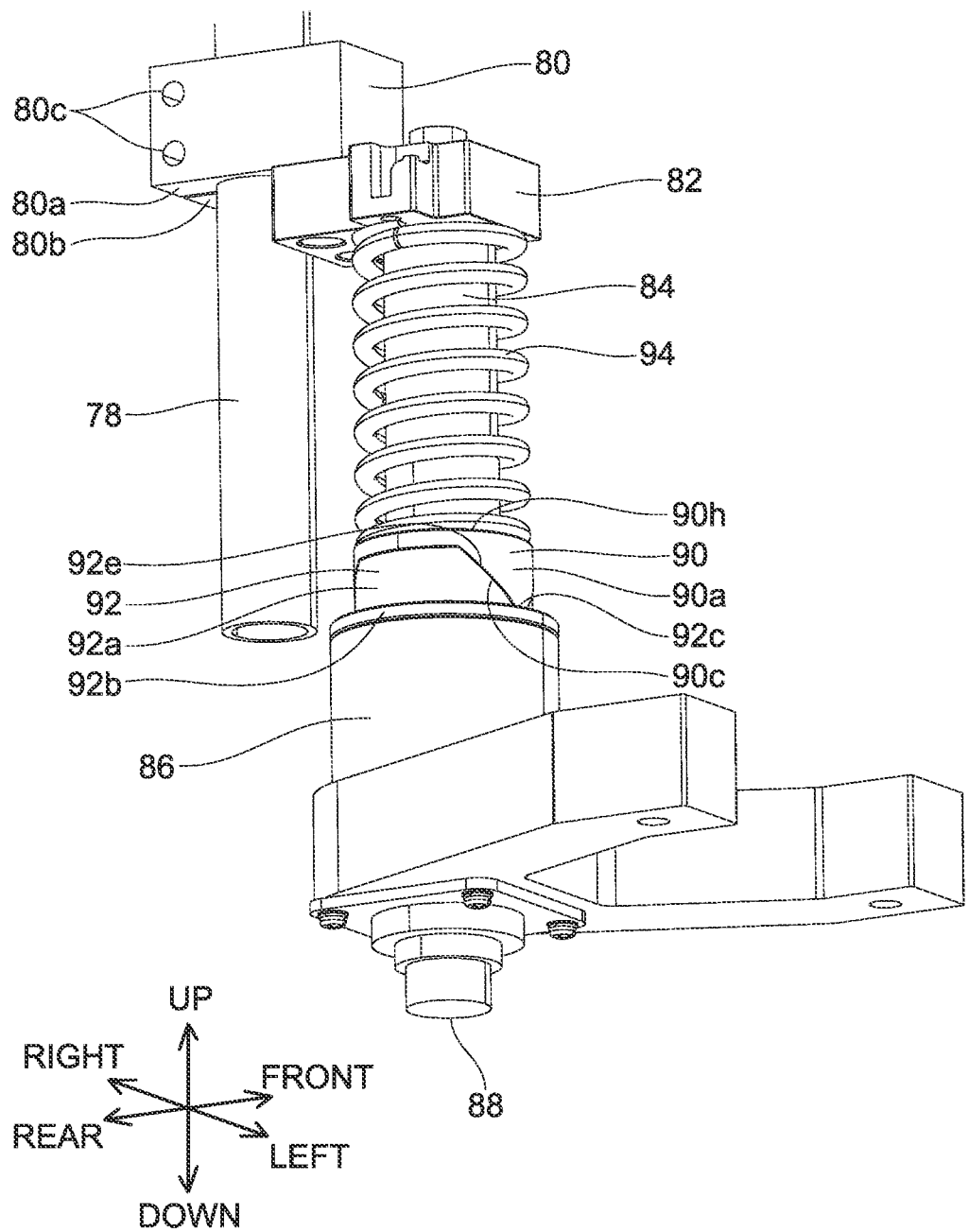
FIG. 7 is a perspective view of the handle unit 8 of the embodiment viewed from the front right lower side.

As shown in FIG. 7, a front portion of the clamping member 80 is fixed to the fixed member 82. The upper end of the handle shaft 84 is fixed to the fixed member 82. The lower end of the handle shaft 84 is rotatably supported by the base member 86. The base member 86 is fixed to the upper surface of the base plate 20 of the carriage unit 4. The rotation angle sensor 88 is fixed to a lower portion of the base member 86. The rotation angle sensor 88 is coupled to the lower end of the handle shaft 84. The rotation angle sensor 88 is configured to detect a rotation angle of the handle shaft 84 with respect to the base member 86. The rotation angle sensor 88 may for example be a potentiometer configured to detect a change in an electric resistance value that is obtained in accordance with a change in the rotation angle. Alternatively, the rotation angle sensor 88 may be a magnetic rotary sensor including a Hall element of which position is fixed with respect to the base member 86 and a permanent magnet of which position is fixed with respect to the handle shaft 84. The rotation angle sensor 88 is electrically connected to the main control circuit board 44 (see FIG. 4).

Figure 8:
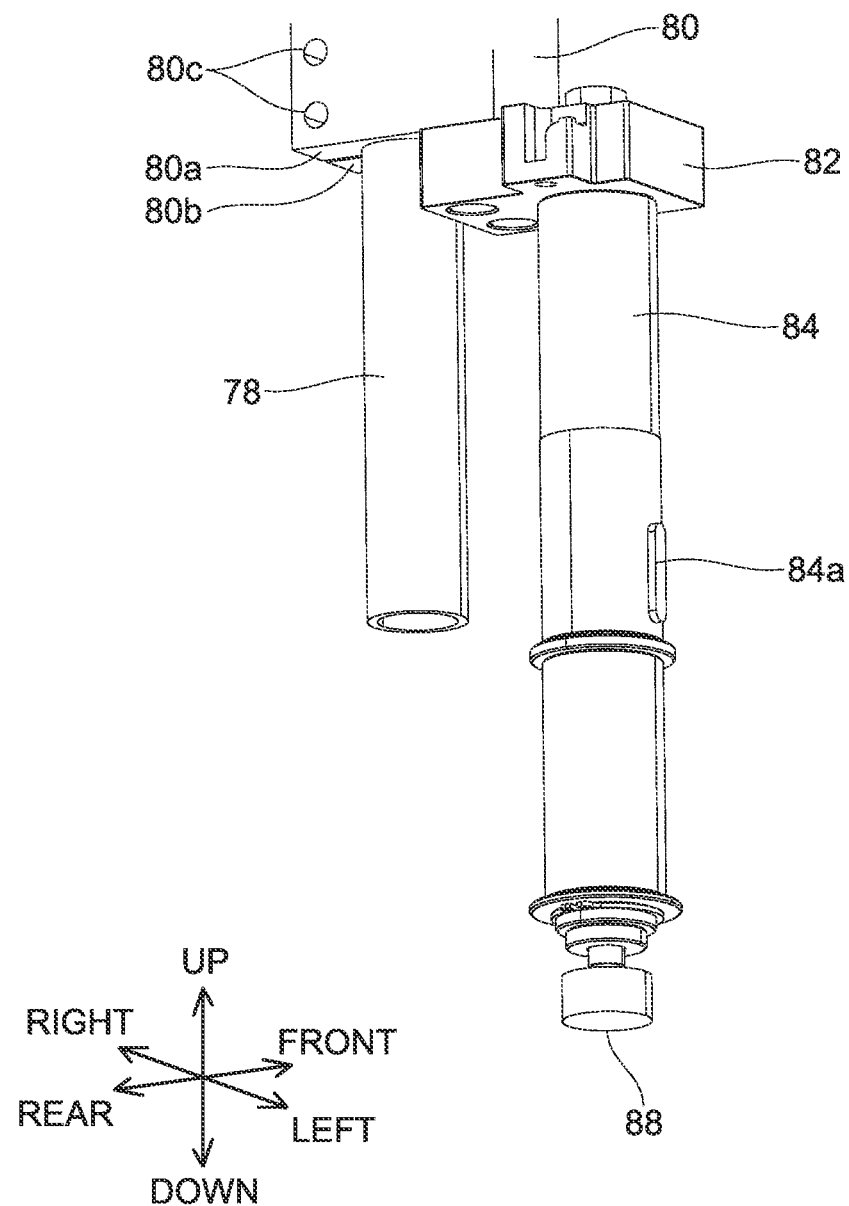
FIG. 8 is a perspective view of a support pipe 78, a clamping member 80, a fixed member 82, a handle shaft 84, and a rotation angle sensor 88 of the handle unit 8 of the embodiment viewed from the front right lower side.

As shown in FIG. 8, the handle shaft 84 includes a guiding protrusion 84a. The guiding protrusion 84a extends radially outward from an outer circumferential surface of the handle shaft 84, and extends along an axial direction of the handle shaft 84.

Figure 9:
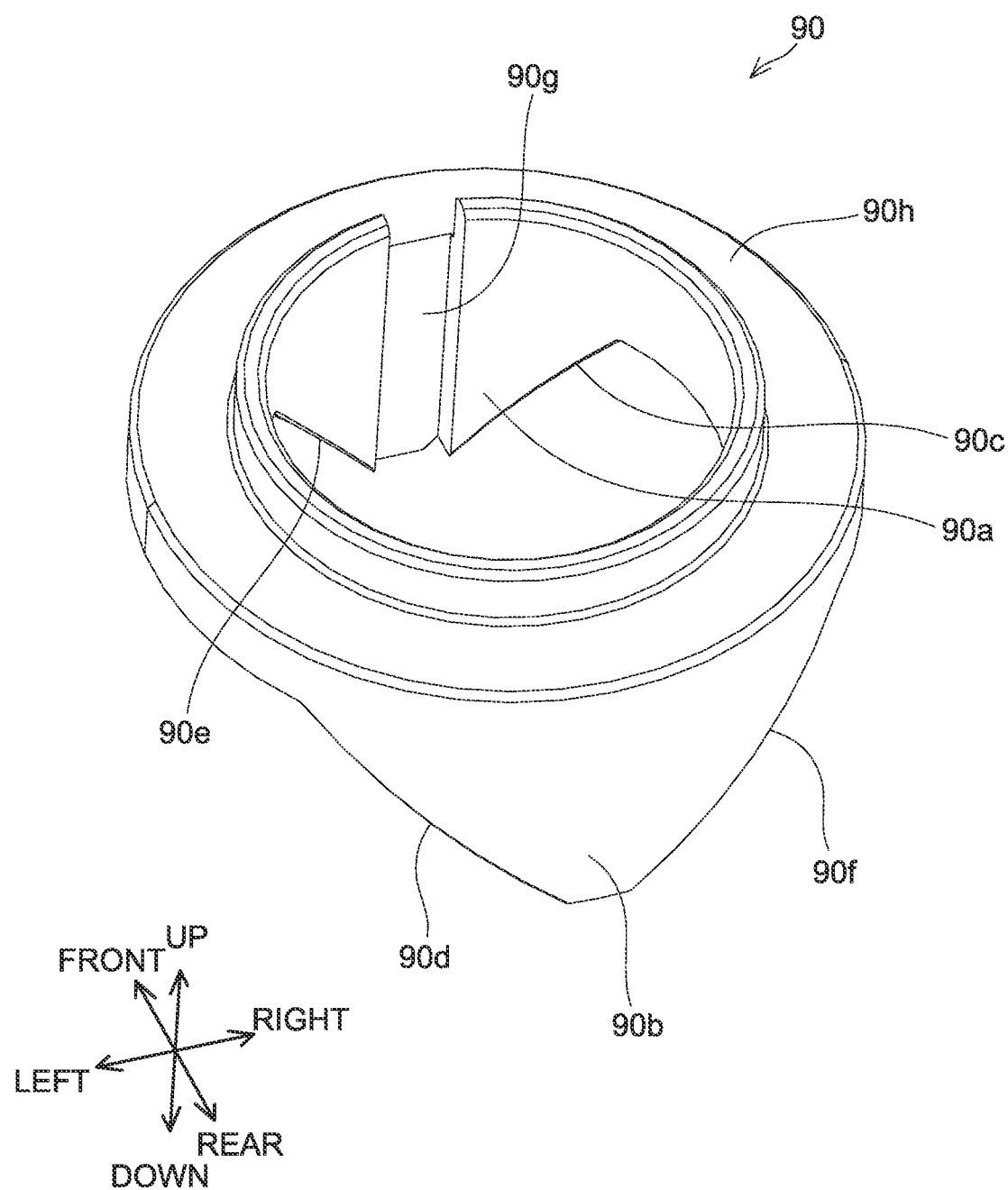
FIG. 9 is a perspective view of a movable cam member 90 of the handle unit 8 of the embodiment viewed from the rear left upper side.

As shown in FIG. 9, the movable cam member 90 has a substantially cylindrical shape. Cam projections 90a, 90b extending downward are arranged at a lower portion of the movable cam member 90. The cam projections 90a, 90b respectively include a first cam surface 90c, 90d and a second cam surface 90e, 90f. The first cam surface 90c, 90d is inclined upward along a clockwise direction in a top view of the movable cam member 90. The second cam surface 90e, 90f is inclined upward along a counterclockwise direction in the top view of the movable cam member 90. A guiding groove 90g is defined in an inner circumferential surface of the movable cam member 90. The guiding groove 90g has a width corresponding to the guiding protrusion 84a (see FIG. 8), and extends in a direction parallel to the center axis of the movable cam member 90. When the movable cam member 90 is to be attached to the handle shaft 84, the guiding protrusion 84a engages with the guiding groove 90g so that the guiding protrusion 84a can slide in the up-down direction. Due to this, the movable cam member 99 is held by the handle shaft 84 so as to be movable in the up-down direction. A spring receiving portion 90h configured to support the coil spring 94 is arranged at an upper portion of the movable cam member 90. As shown in FIG. 7, the coil spring 94 is configured to bias the movable cam member 90 downward with respect to the fixed member 82.

Figure 10:
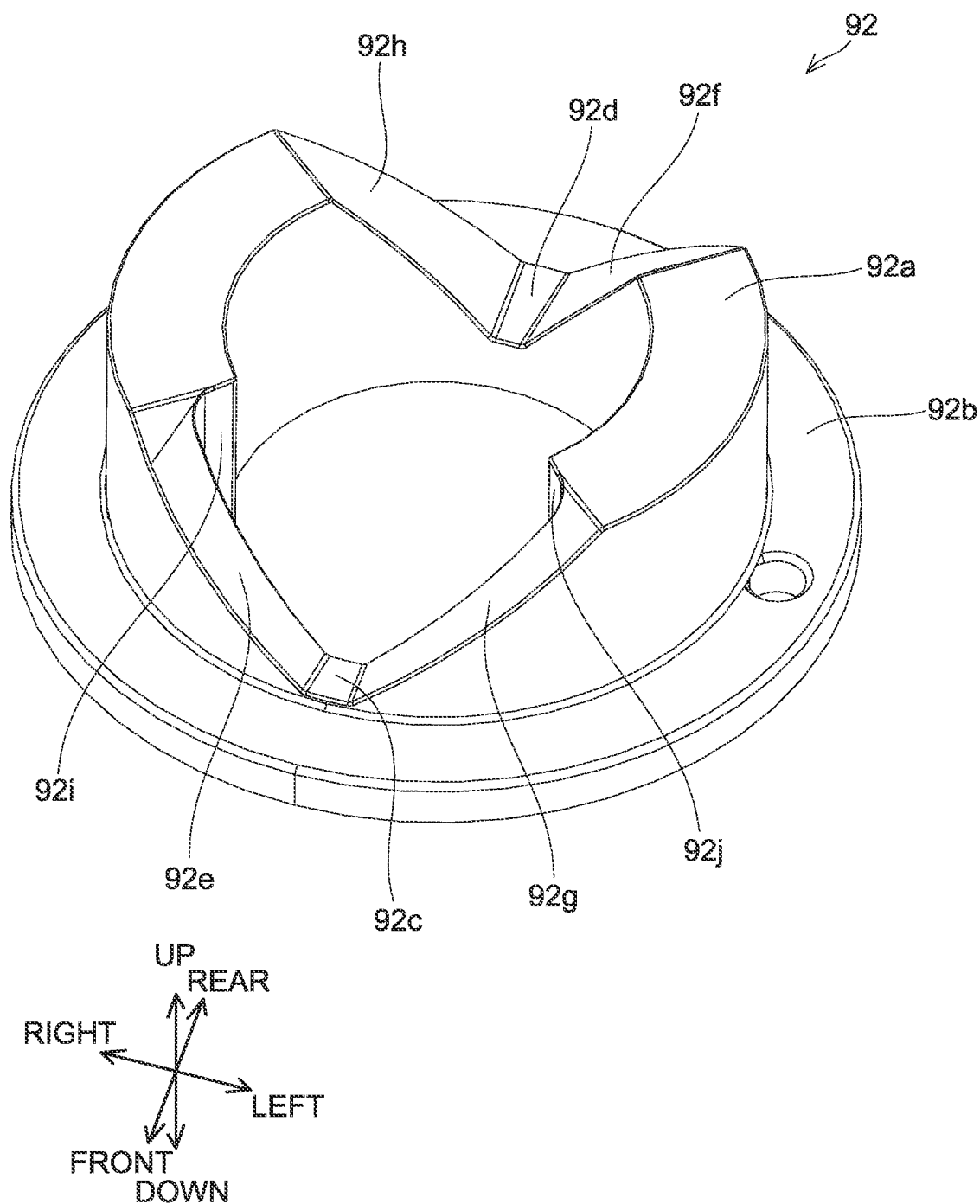
FIG. 10 is a perspective view of a fixed cam member 92 of the handle unit 8 of the embodiment viewed from the front left upper side.

As shown in FIG. 10, the fixed cam member 92 includes a cylinder portion 92a having a substantially cylindrical shape and a flange 92b extending radially outward from the lower end of the cylinder portion 92a. The fixed cam member 92 is fixed to the base member 86 by having the flange 92b fastened on an upper surface of the base member 86 (see FIG. 7) by a fastening member (not shown). Caro recesses 92c, 92d corresponding to the cam projections 90a, 90b of the movable cam member 90 are defined at an upper portion of the cylinder portion 92a. The cam recesses 92c, 92d respectively have a first cam surface 92e, 92f and a second cam surface 92g, 92h. The first cam surface 92e, 92f respectively corresponds to the first cam surface 90c, 90d of the movable cam member 90. The second cam surface 92g, 92h respectively corresponds to the second cam surface 90e, 90f of the movable cam member 90. Further, stopper portions 92i, 92j are arranged on an inner circumferential surface of the cylinder portion 92a. As shown in FIG. 11, the stopper portions 92i, 92j are configured to restrict a rotatable range of the handle shaft 84 by coming into abutment with the guiding protrusion 84a of the handle shaft 84 when the handle shaft 84 rotates with respect to the fixed cam member 92.

Figure 12:
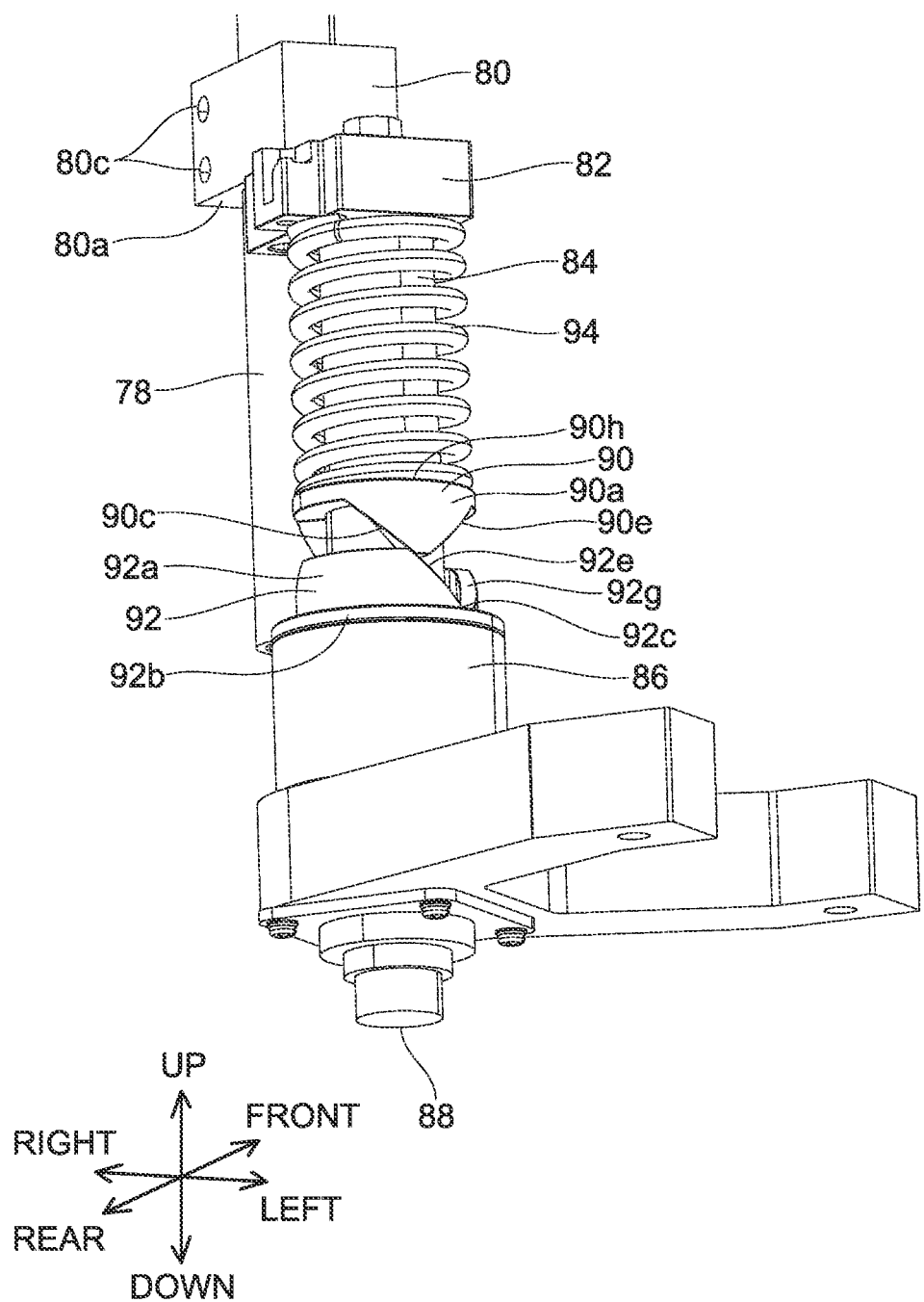
FIG. 12 is a perspective view of the lower portion of the handle unit 8 of the embodiment viewed from the front right lower side in the state in which the operation to steer the handle unit 8 to the right is performed.

In the handle unit 8 shown in FIG. 6, when the user rotates the steering handle 73 clockwise (or counterclockwise) as viewed from above, the handle shaft 84 rotates clockwise (or counterclockwise). At this occasion, as shown in FIG. 12, due to the movable cam member 99 rotating integrally with the handle shaft 84, the first cam surface 90c, 90d (or the second cam surfaces 90e, 90f) of the movable cam member 90 slides with respect to the first cam surface 92e, 92f (or the second cam surface 92g, 92h) of the fixed cam member 92, as a result of which the movable cam member 90 moves upward against the biasing force of the coil spring 94 as it rotates with respect to the fixed cam member 92. In this operating, torque generated by a reaction force which the movable cam member 90 receives from the fixed cam member 92 acts on the user rotating the steering handle 73.

In the handle unit 8, the fixed member 82, the handle shaft 84, the coil spring 94, the movable cam member 90, the fixed cam member 92, and the rotation angle sensor 88 are arranged coaxially. By configuring as such, dimensions of the handle unit 8 in the front-rear direction and in the left-right direction am be reduced.

(Handle Unit 108)

Figure 13:
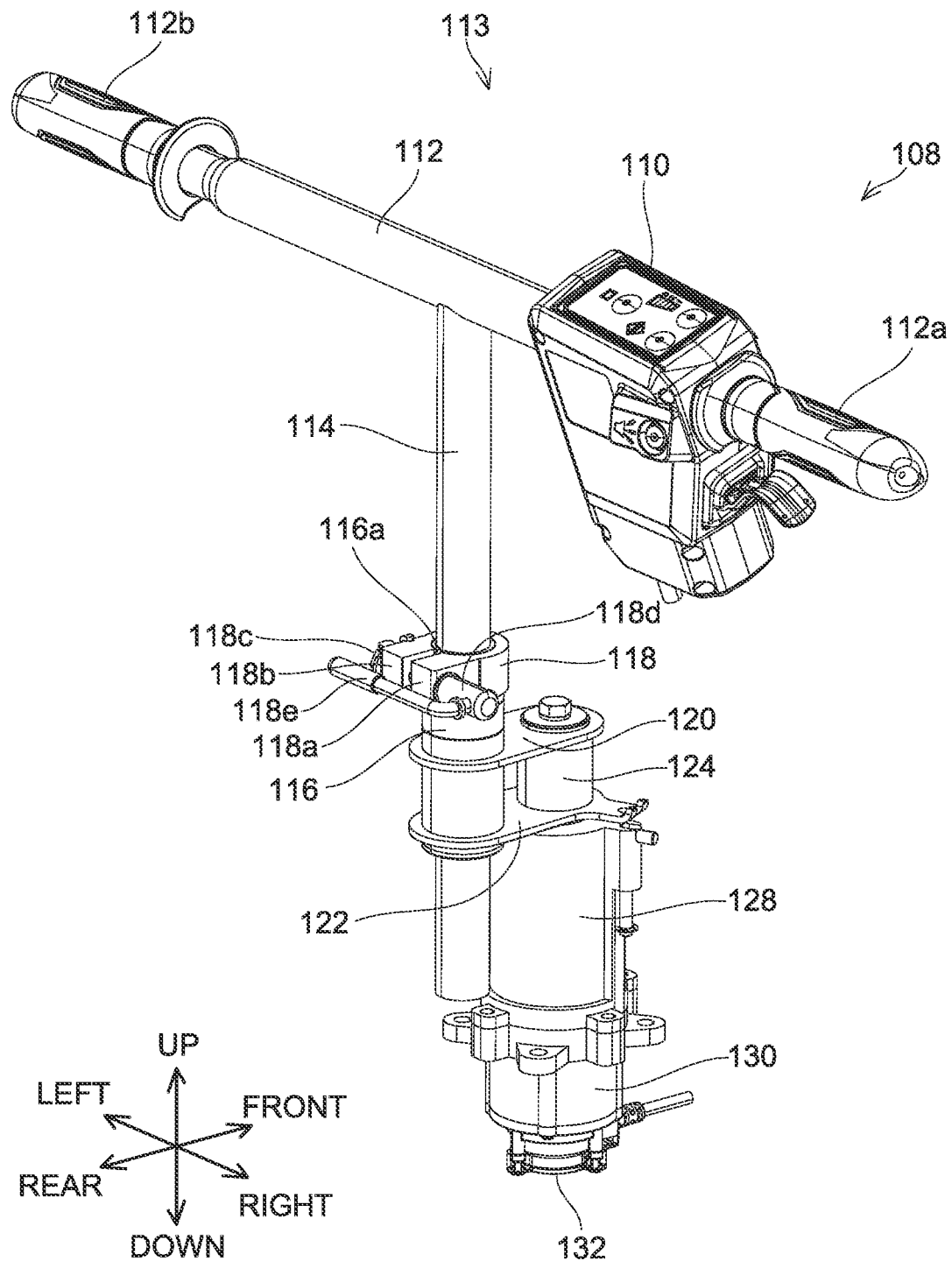
FIG. 13 is a perspective view of a handle unit 108 of a variant viewed from the rear right upper side.

The cart 2 may include a handle unit 108 shown in FIGS. 13 to 19 instead of the handle unit 8. As shown in FIG. 13, the handle unit 108 includes a switch box 110, a handle bar 112, a support pipe 114, a clamping sleeve 116, a clamping member 118, an upper arm plate 120, a lower arm plate 122, a handle sleeve 124, a handle shaft 126 (see FIG. 15), a cover member 128, a base member 130, a rotation angle sensor 132, a slide sleeve 134 (see FIG. 15), and a coil spring 136 (see FIG. 15). Hereinbelow, the handle bar 112 and the support pipe 114 may collectively be termed a steering handle 113.

Figure 14:
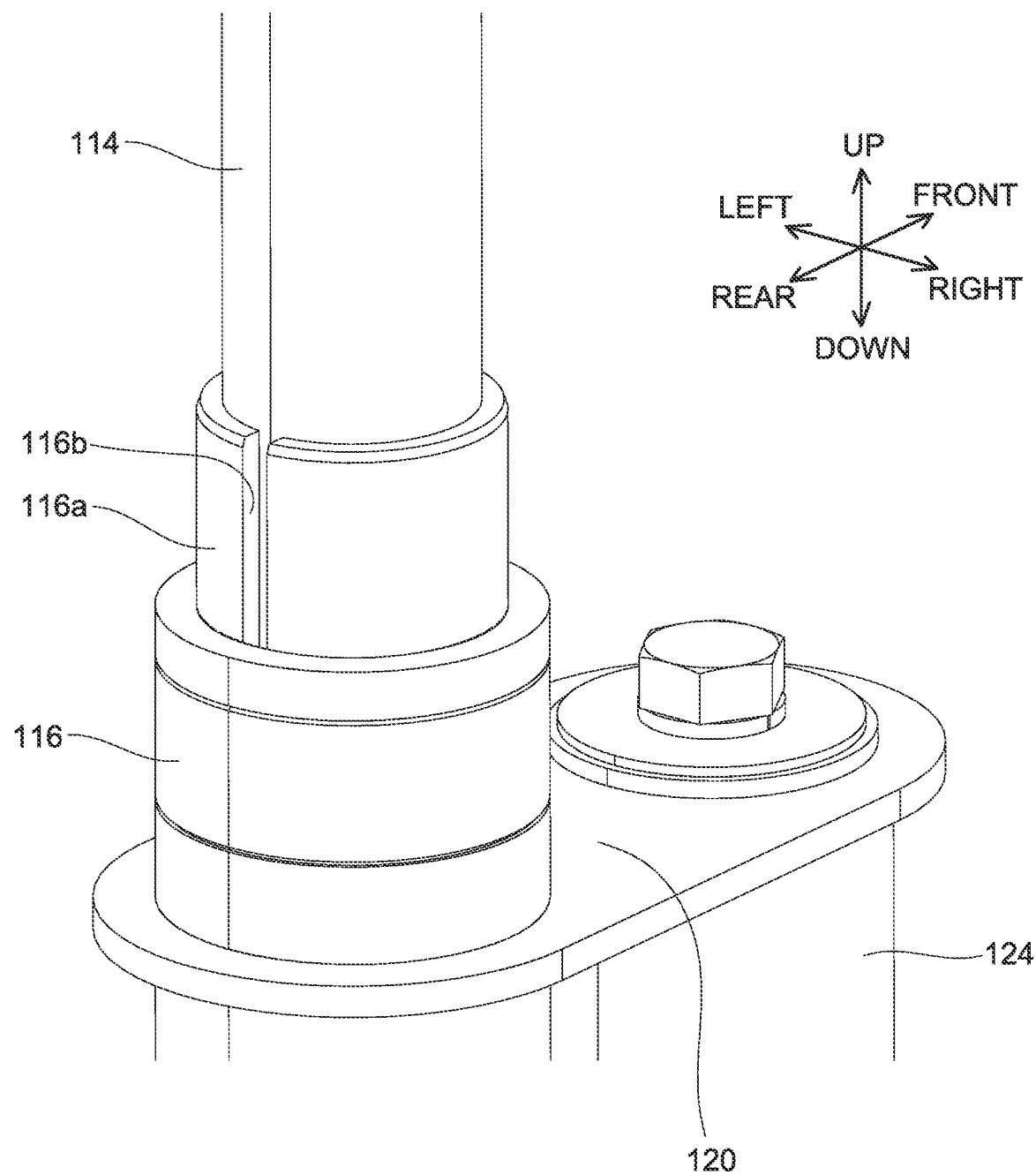
FIG. 14 is a perspective view of a support pipe 114, a clamping sleeve 116, an upper arm plate 120, and a handle sleeve 124 of the handle unit 108 of the variant viewed from the rear right upper side.

The handle bar 112 extends in the left-right direction. A right grip 112a is arranged at the right end of the handle bar 112. The switch box 110 is fixed to the handle bar 112 in the vicinity of the right grip 112a. The switch box 110 has a substantially the same configuration as the switch box 70 of the handle unit 8. A left grip 112b is arranged at the left end of the handle bar 112. The upper end of the support pipe 114 is fixed to the center of the handle bar 112. The support pipe 114 extends in the up-down direction. The support pipe 114 penetrates through the clamping sleeve 116. As shown in FIG. 14, a clamping portion 116a is arranged at the upper end of the clamping sleeve 116. The clamping portion 116a includes a slit 116b extending downward from the upper end of the clamping portion 116a. As shown in FIG. 13, the clamping member 118 includes clamping parts 118a, 118b configured to clamp the clamping portion 116a of the clamping sleeve 116 from both left and right sides. A bolt 118c and a nut 118d are attached to the rear ends of the clamping parts 118a, 118b. The bolt 118c penetrates through rear portions of the clamping parts 118a, 118b. The nut 118d is screw-fastened to the distal end of the bolt 118c. A pin 118e is arranged on the nut 118d. The nut 118d can be rotated with respect to the bolt 118c by lifting the pin 118e and rotating the pin 118e with respect to the bolt 118c. When the nut 118d is tightened onto the bolt 118c, the clamping parts 118a, 118b are firmly pressed against an outer surface of the clamping portion 116a of the clamping sleeve 116, and an inner surface of the clamping portion 116a is thereby pressed firmly against an outer surface of the support pipe 114. The support pipe 114 is thereby fixed with respect to the clamping sleeve 116. When the nut 118d is loosened from the bolt 118c, the clamping parts 118a, 118b are no longer pressed against the outer surface of the clamping sleeve 116, and the inner surface of the clamping portion 116a is no longer pressed against the outer surface of the support pipe 114. Due to this, the support pipe 114 thereby becomes movable in the up-down direction with respect to the clamping sleeve 116, and also rotatable about the up-down direction. A position and an angle of the support pipe 114 with respect to the clamping sleeve 116 can be fixed by adjusting the support pipe 114 to a desired position and angle with respect to the clamping sleeve 116 with the nut 118d loosened from the holt 118c, and thereafter tightening the nut 118d onto the holt 118c.

Figure 15:
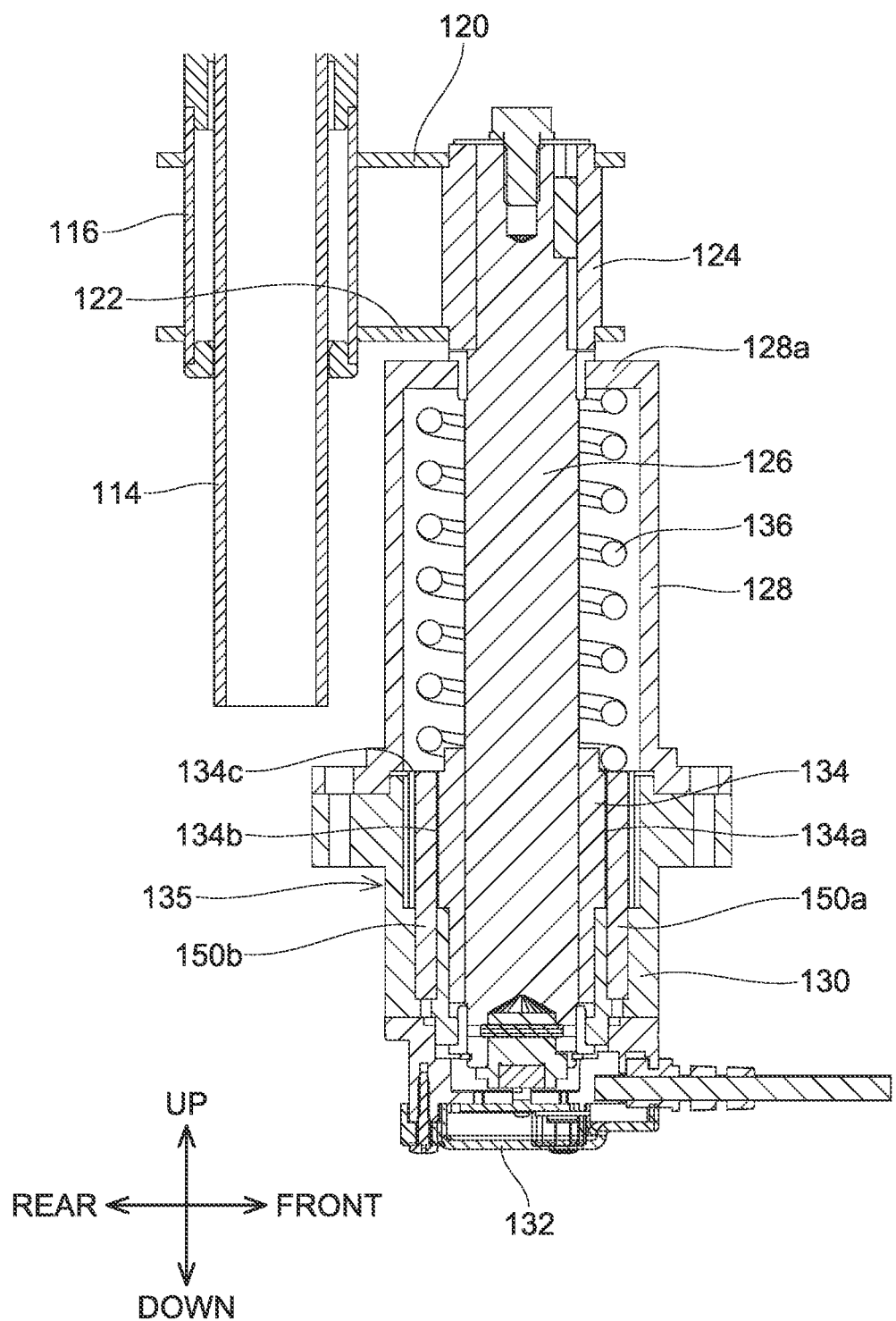
FIG. 15 is a cross-sectional view of a lower portion of the bundle unit 108 of the variant in a cross section along the front-rear and up-down directions.

As shown in FIG. 15, the upper arm plate 120 couples the clamping sleeve 116 to the handle sleeve 124. The lower arm plate 122 couples the clamping sleeve 116 to the handle sleeve 124 at a position lower than the upper arm plate 120. The handle sleeve 124 is fixed to the upper end of the handle shaft 126. The handle shaft 126 penetrates through the cover member 128 and the base member 130. The cover member 128 rotatably supports the handle shaft 126 at the upper end of the cover member 128. The base member 130 rotatably supports the handle shaft 126 at the lower end of the base member 130. The cover member 128 is fixed to the base member 130. The base member 130 is fixed to the upper surface of the base plate 20 (see FIG. 3) of the carriage unit 4. The rotation angle sensor 132 is fixed to a lower portion of the base member 130. The rotation angle sensor 132 is coupled to the lower end of the handle shall 126. The rotation angle sensor 132 is configured to detect a rotation angle of the handle shaft 126 with respect to the base member 130. The rotation angle sensor 132 may for example be a potentiometer configured to detect a change in an electric resistance value that is obtained in accordance with a change in the rotation angle. Alternatively, the rotation angle sensor 332 may be a magnetic rotary sensor including a Hall element of which position is fixed with respect to the base member 130 and a permanent magnet of which position is fixed with respect to the handle shaft 126. The rotation angle sensor 132 is electrically connected to the main control circuit board 44 (see FIG. 4).

Figure 16:
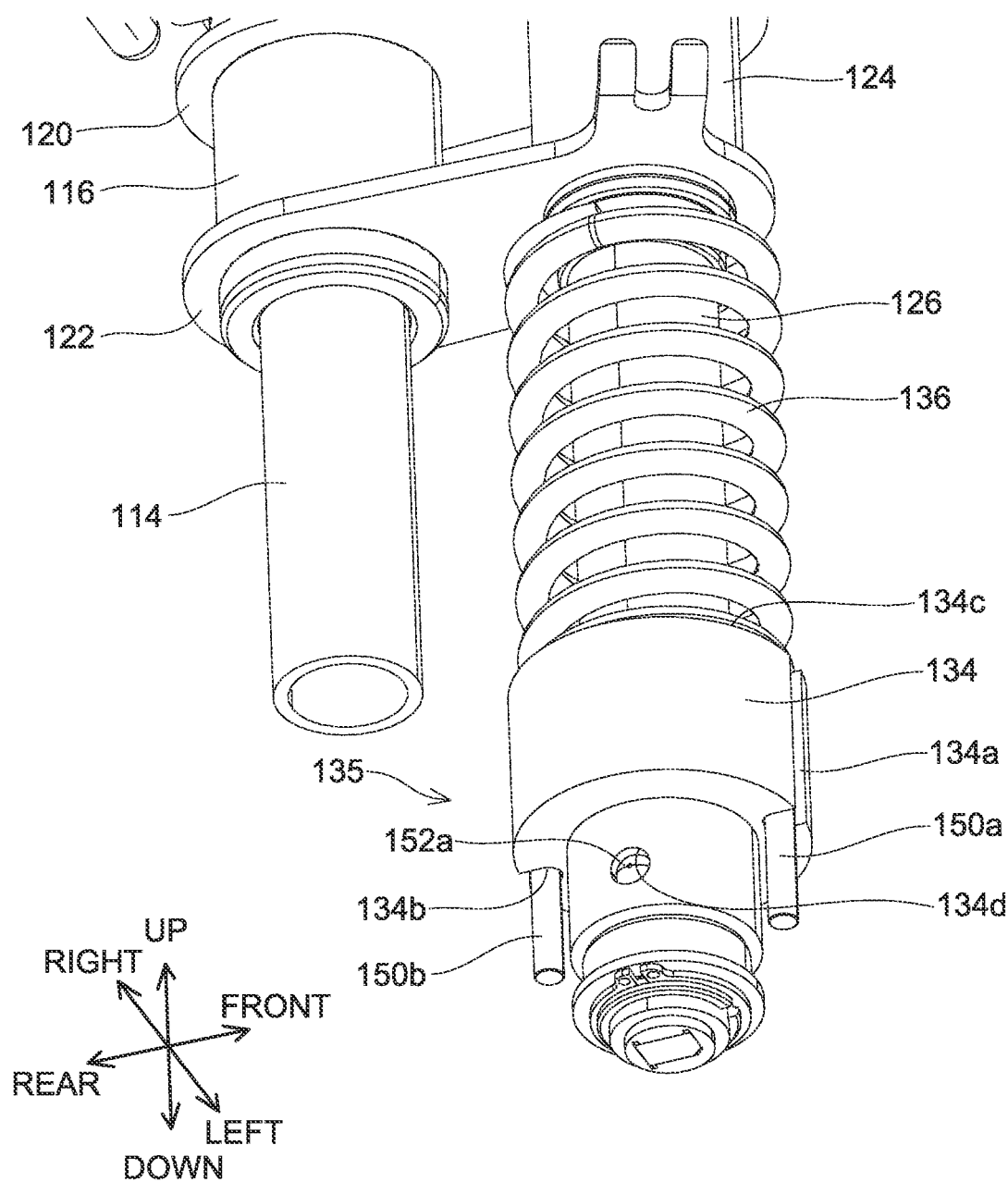
FIG. 16 is a perspective view of the support pipe 114, the clamping sleeve 116, the upper arm plate 120, a lower arm plate 122, the handle sleeve 124, a handle shaft 126, a slide sleeve 134, and a coil spring 136 of the handle unit 108 of the variant viewed hum the front right lower side.

The slide sleeve 134 is attached to the handle shaft 126 inside the cover member 128 and the base member 130 so as to cover an outer peripheral surface of the handle shaft 126. As shown in FIG. 16, the slide sleeve 134 includes guiding grooves 134a, 134b, spring receiving portions 134c, and ball holding holes 134d, 134e (see FIG. 17). The guiding grooves 134a, 134b are depressed radially inward from an outer peripheral surface of the slide sleeve 134 and extends along the up-down direction. Guide pins 150a, 150b extending in the up-down direction are slidably engaged with the guiding grooves 134a, 134b. As shown in FIG. 15, lower portions of the guide pins 150a, 150b are fixed to the base member 130. Due to this, the slide sleeve 134 is supported so that the slide sleeve 134 is movable in the up-down direction with respect to the base member 130. The spring receiving portion 134c supports the lower end of the coil spring 136. The coil spring 136 is arranged inside the cover member 128 and the base member 130, and is configured to bias the slide sleeve 134 downward with respect to the cover member 128. In the description below, a portion at an upper portion of the cover member 128 that supports the upper end of the coil spring 156 may be termed a fixed member 128a.

Figure 17:
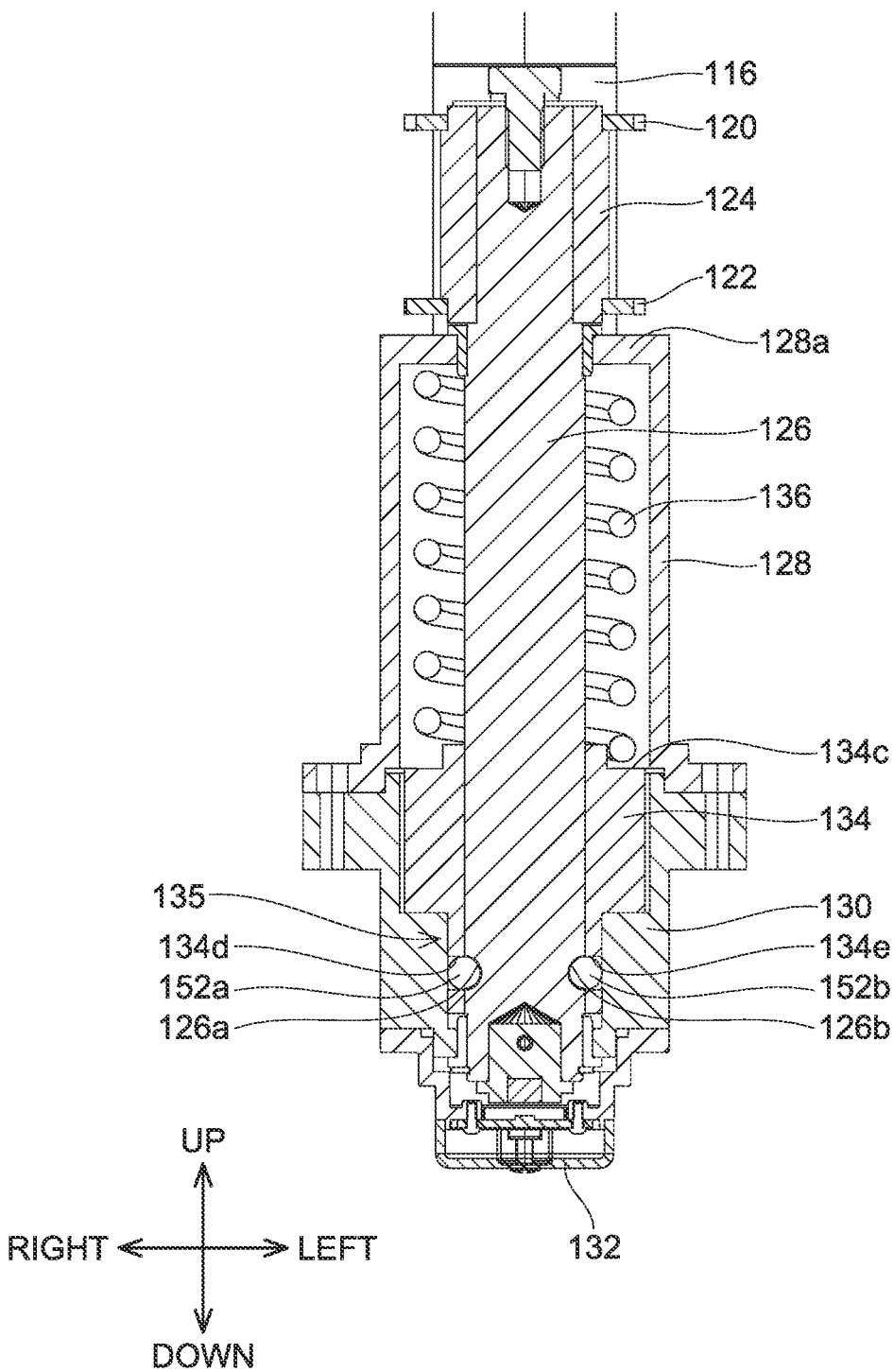
FIG. 17 is a cross-sectional view of the lower portion of the handle unit 108 of the embodiment in a cross section along the left-right and up-down directions.
Figure 18:
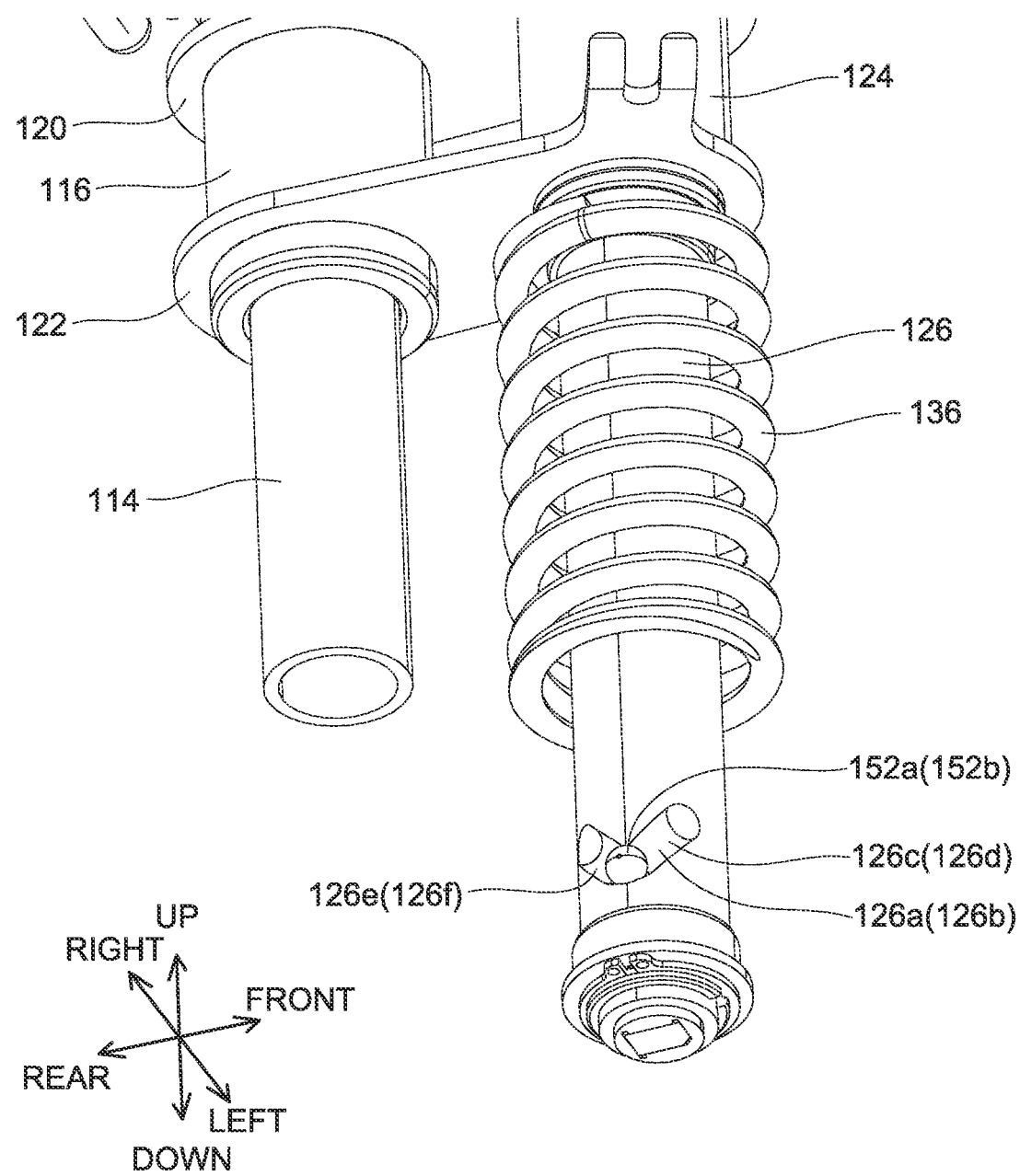
FIG. 18 is a perspective view of the support pipe 114, the clamping sleeve 116, the upper arm plate 120, the lower arm plate 122, the handle sleeve 124, the handle shaft 126, and the coil spring 136 of the handle unit 108 of the variant viewed from the front right lower side.

As shown in FIG. 17, balls 152a, 152b are placed inside the ball holding holes 134d, 134e from the inner side. An inner diameter of the ball holding holes 134d, 34e is slightly larger than an outer diameter of the balls 152a, 152b. Since outside of the ball holding holes 134d, 134e is covered by the base member 130, the ball holding holes 134d, 134e rotatably hold the balls 152a, 152b. The balls 152a, 152b are further placed inside ball grooves 126a, 126b defined in the outer peripheral surface of the handle shall 126 from the outer side. As shown m FIG. 18, the ball grooves 126a, 126b each have a first ball groove 126c, 126d inclined upward from a lower portion along the counterclockwise direction when the handle shaft 126 is viewed from above, and a second ball groove 126e, 126f inclined upward from a lower portion along the clockwise direction in the same top view. The balls 152a, 152b are respectively rotatable along the first ball grooves 126c, 126d and the second ball grooves 126e, 126f. In the following description, the slide sleeve 134 and the balls 152a, 152b may collectively be termed a movable cam member 135 free FIG. 17).

Figure 19:
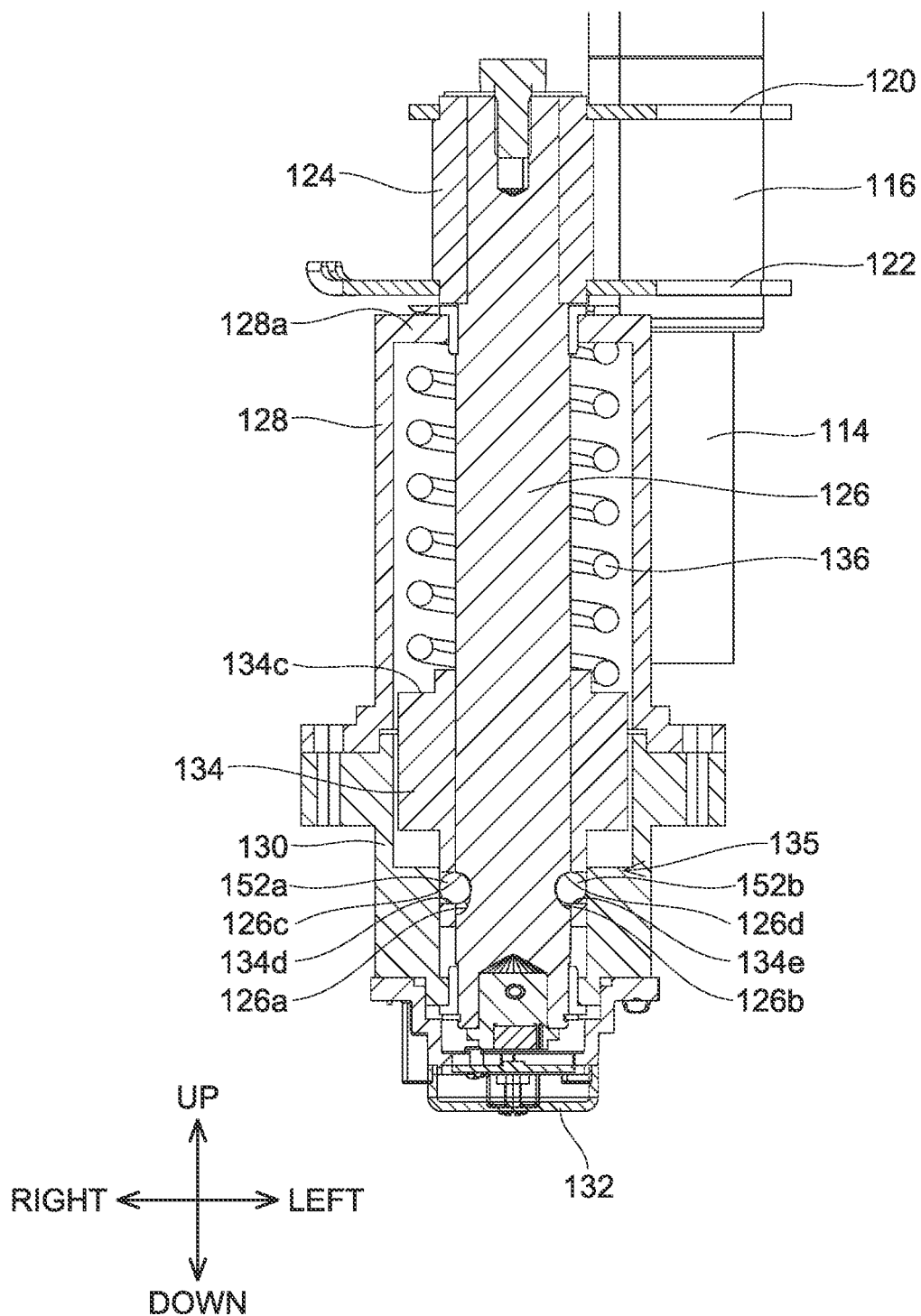
FIG. 19 is a cross-sectional view of the lower portion of the handle unit 108 of the variant in a cross section along the left-right and up-down directions in the state in which an operation to steer the handle unit 108 to the right is performed.

In the handle unit 108 shown in FIG. 13, when the user rotates the steering handle 113 clockwise (or counterclockwise) as viewed from above, the handle shaft 126 rotates clockwise (or counterclockwise). At this occasion, as shown in FIG. 19, due to the balls 152a, 152b held in the ball holding holes 134d, 134e rolling in the first ball grooves 126c, 126d (or second ball grooves 126e, 126f) of the handle shaft 126, the slide sleeve 134 moves upward against the biasing force of the coil spring 136. In this operation, torque generated by a reaction force which the handle shaft 126 receives from the slide sleeve 134 through the balls 152a, 152b acts on the user rotating the steering handle 113.

In the handle unit 108, the fixed member 128a, the handle shaft 126, the coil spring 136, the movable cam member 135, and the rotation angle sensor 132 are arranged coaxially. By configuring as such, dimensions of the handle unit 108 in the front-rear direction and in the left-right direction can be reduced. Further, in the handle unit 108, majority of the handle shaft 126 and peripheries of the coil spring 136 and the movable cam member 135 are covered by the cover member 128 and the base member 130. By configuring as such, operational failures caused by mud and water adhering to the handle shaft. 126, the coil spring 136, and the movable cam member 135 can be suppressed.

(Steering Unit 10)

Figure 20:
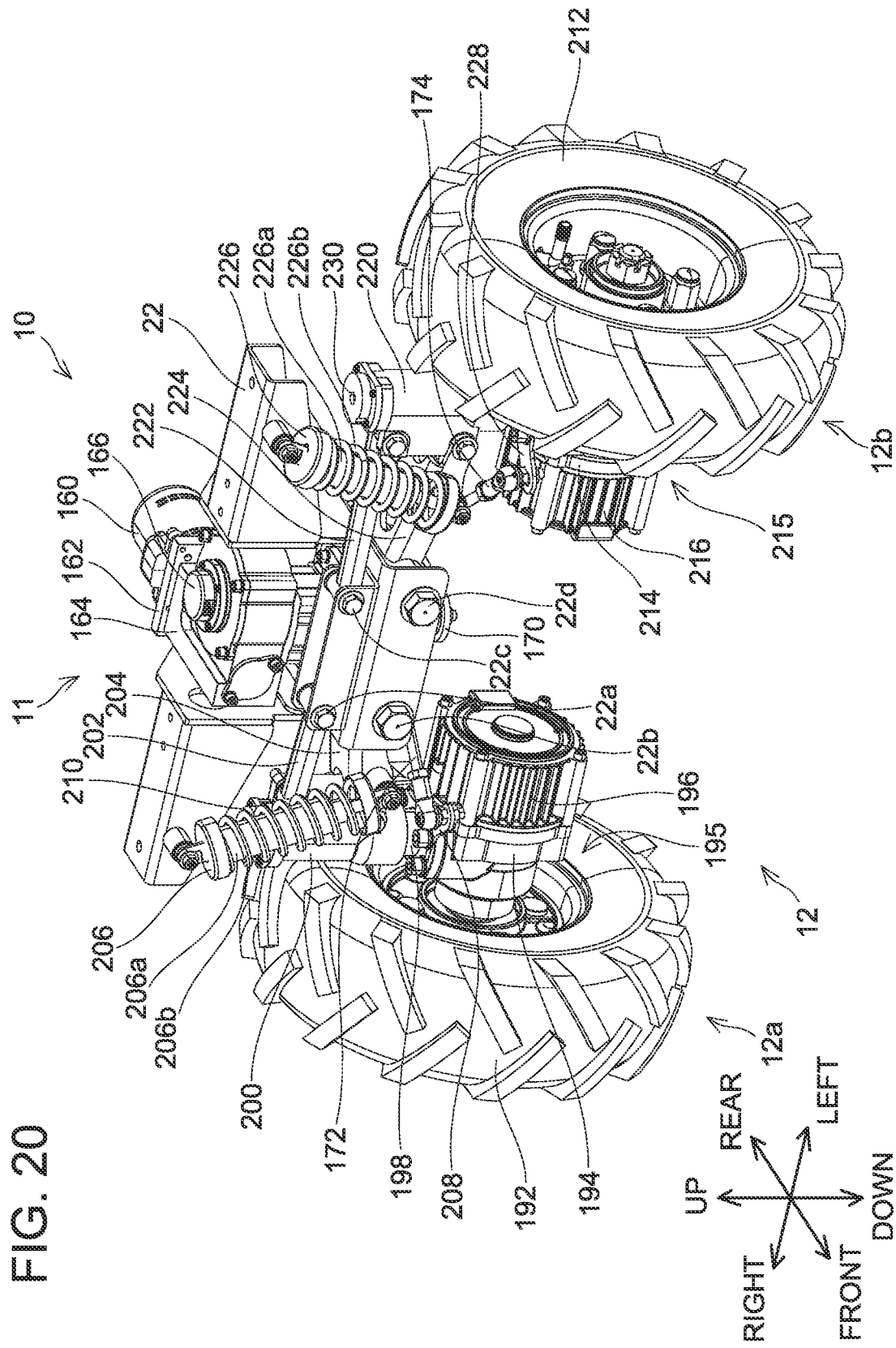
FIG. 20 is a perspective view of a steering unit 10 and a front wheel unit 12 of the embodiment viewed from the front left upper side.

As shown in FIG. 20, the steering, unit 10 is attached to the front support member 22 at a front lower portion of the base plate 20 of the carriage unit 4 (see FIG. 2). The steering unit 10 is linked to the from wheel unit 12, and is configured to steer the front wheel unit 12.

Figure 21:
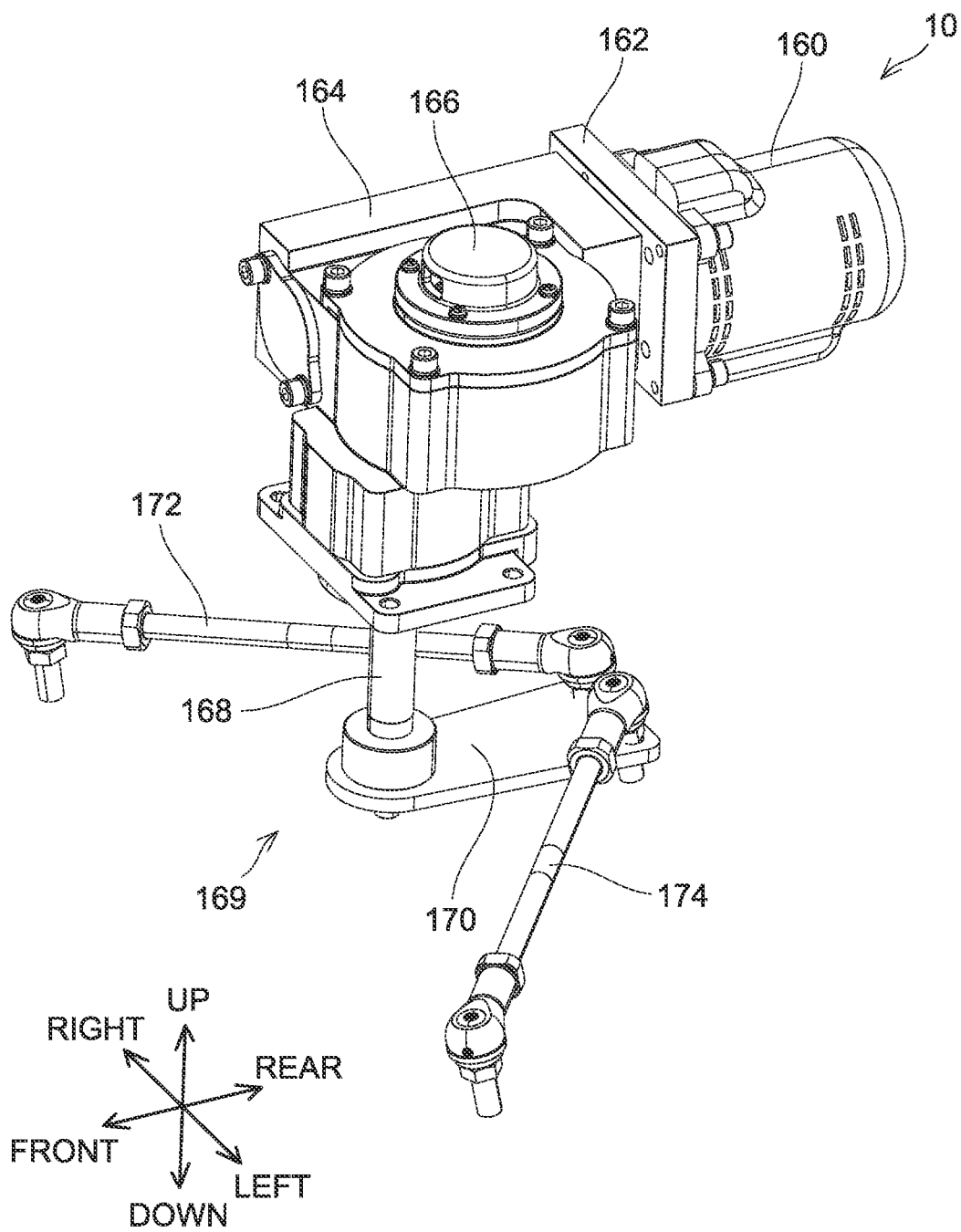
FIG. 21 is a perspective view of the steering unit 10 of the embodiment viewed from the front left upper aide.

As shown in FIG. 21, the steering unit 10 includes a motor housing 160, a motor support member 162, a gear housing 164, a steering angle sensor 166, a steering shaft 168, a steering plate 170, a right tie rod 172, and a left tie rod 174. The motor housing 160 is fixed to the motor support member 162. The motor support member 162 is fixed to the gear housing 164. The gear housing 164 is fixed to the front support member 22 of the carriage unit 4 (see FIG. 20).

Figure 22:
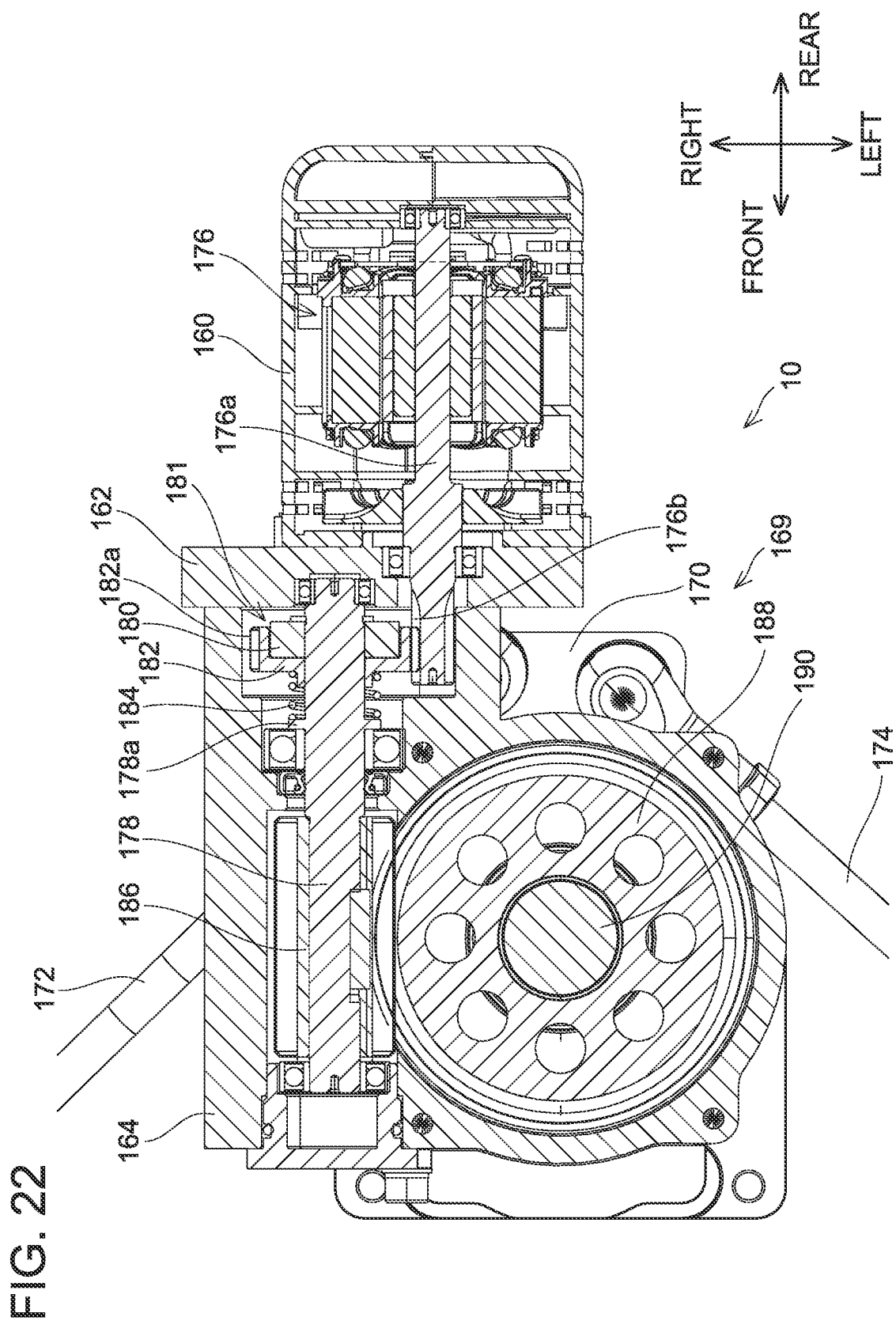
FIG. 22 is a cross-sectional view of the steering unit 10 of the embodiment in a cross section along the front-rear and left-right directions.

As shown in FIG. 22, the steering motor 176 is housed inside the motor housing 160. The steering motor 176 may for example be an inner rotor brushless DC motor. The steering motor 176 is electrically connected to the drive control circuit board 46 (see FIG. 5). The drive control circuit board 46 is configured to control operation of the steering motor 176. The steering motor 176 includes a motor shaft 176a extending in the front-rear direction. The motor shaft 176a is rotatably held by the motor housing 160 at the vicinity of its rear end and is rotatably held by the motor support member 162 at its front portion. The front portion of the motor shaft 176a penetrates through the motor support member 162 and enters into the gear housing 164. A gear portion 176b is arranged in the vicinity of the front end of the motor shaft 176a.

The gear housing 164 houses a spindle 178, a cam wheel 180, a movable gear 182, a coil spring 184, a cylindrical worm 186, a worm wheel 188, and a relay shaft 190. The spindle 178 is arranged along the front-rear direction. The spindle 178 is rotatably held by the gear housing 164 in the vicinity of its front end and its rear portion. Further, the spindle 178 is rotatably held by the motor support member 162 in the vicinity of its rear end.

Figure 23:
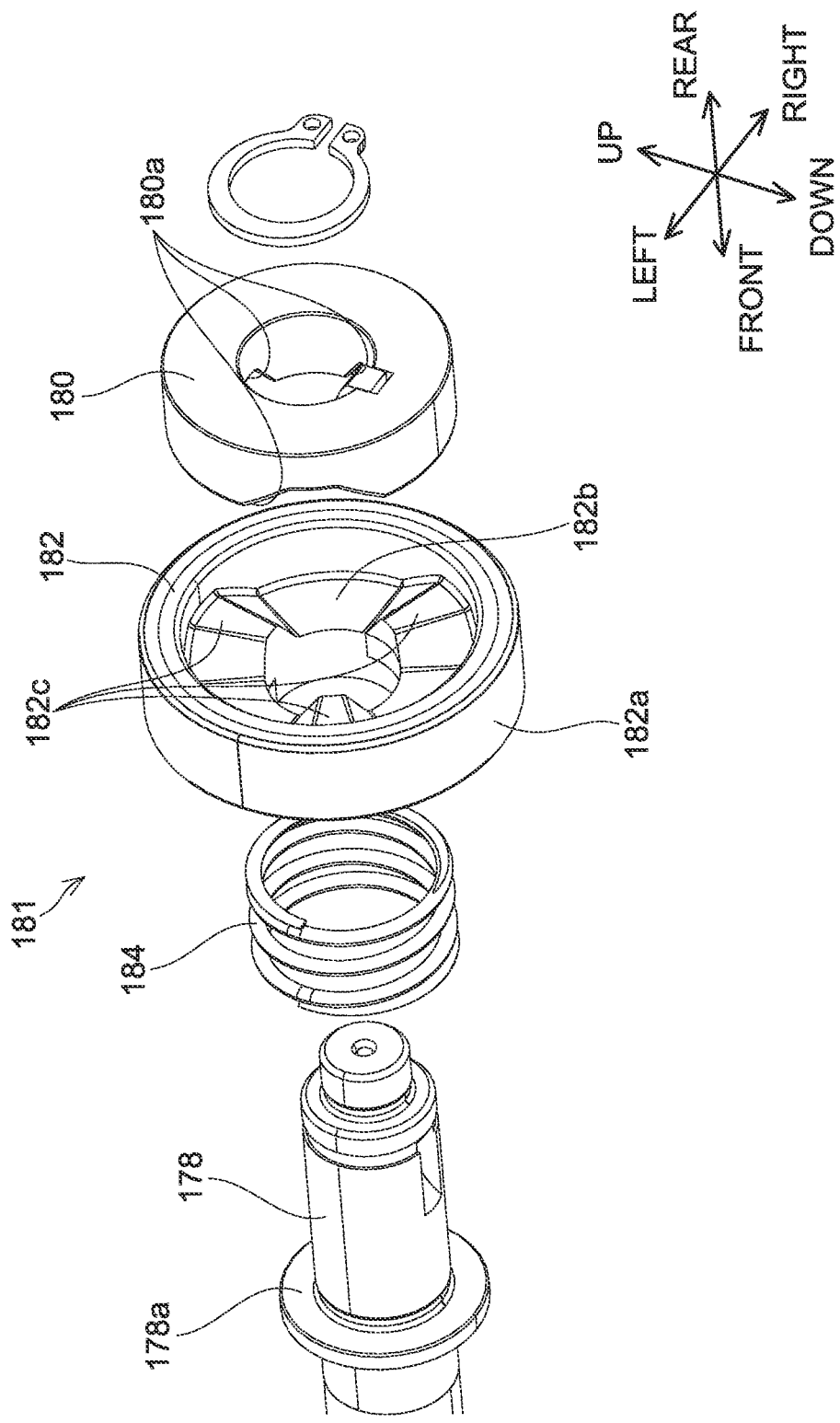
FIG. 23 is a perspective view of a spindle 178, a cam wheel 180, a movable gear 182, and a coil spring 184 of the steering unit 10 of the embodiment viewed from the rear left lower side.

The cam wheel 180 is fixed in the vicinity of the rear end of the spindle 178. As shown in FIG. 23, cam grooves 180a are defined in a from surface of the cam wheel 180. The movable gear 182 is attached to the spindle 178 at a position frontward from the cam wheel 180. The movable gear 182 is held by the spindle 178 such that the movable gear 182 can move m the front-rear direction with respect to the spindle 178 and rotate about the front-rear direction. A gear portion 182a configured to mesh with the gear portion 176b of the motor shaft 176a (see FIG. 22) is arranged on an outer circumferential surface of the movable gear 182. A recess 182b into which the cam wheel 180 is to enter is defined in a rear portion of the movable gear 182. Cam projections 182c corresponding to the cam grooves 180a of the cam wheel 180 are arranged in the recess 182b. The coil spring 184 is attached to the spindle 178 at a position frontward from the movable gear 182. The coil spring 184 is held by a spring receiving portion 178a arranged on the spindle 178. The coil spring 184 is configured to bias the movable gear 182 rearward relative to the spindle 178.

When the motor shaft 176a (see FIG. 22) rotates, the movable gear 182 also rotates. In the case where the cam projections 182c of the movable gear 182 are engaged with the cam grooves 180a of the cam wheel 180, the cam wheel 180 rotates along with rotation of the movable gear 182, as a result of which the spindle 178 also rotates. When torque acting between the movable gear 182 and the cam wheel 180 is small, engagement of the cam projections 182c and the cam grooves 180a is maintained by a biasing force or the coil spring 184, and transmission of the rotation from the motor shaft 176a to the spindle 178 is maintained. Contrary to this, when the torque acting between the movable gear 182 and the cam wheel 180 is large, the movable gear 182 moves forward against, the biasing force of the coil spring 184, by which the engagement of the cam projections 182c and the cam grooves 180a is released, and the transmission of the rotation from the motor shall 176a to the spindle 178 is thereby blocked. That is, a torque limiter 181 is constituted by the cam wheel 180, the movable gear 182, and the coil spring 184.

Figure 24:
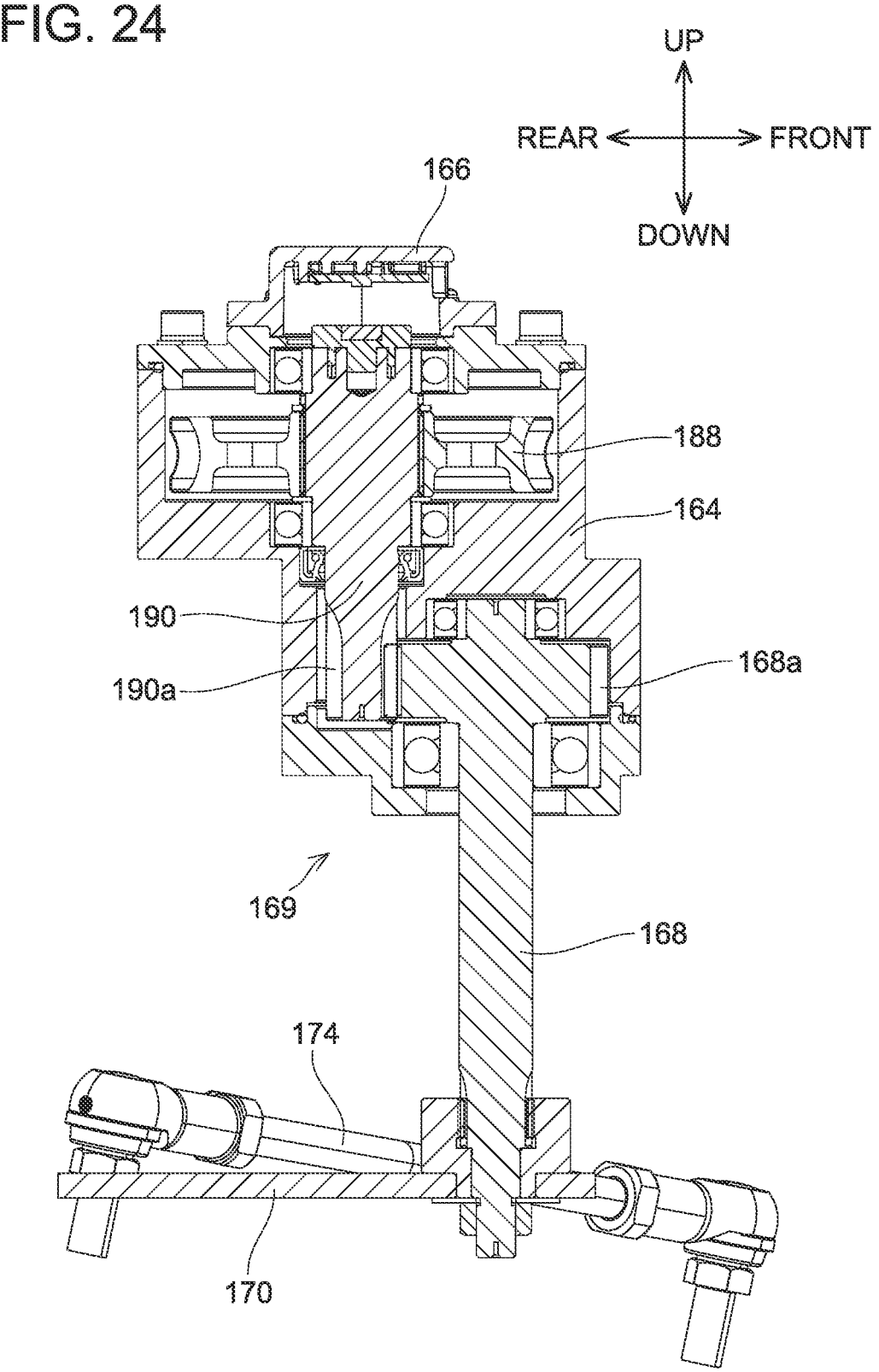
FIG. 24 is a cross-sectional view of the steering unit 10 of the embodiment in a cross section along the front-rear and up-down directions.

As shown in FIG. 22, the cylindrical worm 186 is fixed to a front portion of the spindle 178. The worm wheel 188 is arranged to mesh with the cylindrical worm 186. As shown in FIG. 24, the worm wheel 188 is fixed to an upper portion of the relay shaft 190. The relay shaft 190 is arranged along the up-down direction. The relay shaft 190 is rotatably held by the gear housing 164 at the vicinity of its upper end and at its center portion. A gear portion 190a is arranged in the vicinity of the lower end of the relay shaft 190.

The steering angle sensor 166 is fixed to an upper portion of the gear housing 164. The steering angle sensor 166 is coupled to the upper end of the relay shah 190. The steering angle sensor 166 is configured to detect a rotation angle of the relay shaft 190 relative to the gear housing 164. The steering angle sensor 166 may for example be a potentiometer configured to detect a change in an electric resistance that occurs in accordance with a change in the rotation angle. Alternatively, the steering angle sensor 166 may be a magnetic rotary sensor having a Hall element of which position is fixed with respect to the gear housing 164 and a permanent magnet of which position is fixed with reject to the relay shaft 190. The steering angle sensor 166 is electrically connected to the main control circuit board 44 (see FIG. 4).

The steering shaft 168 is rotatably held by the gear housing 164 at the vicinity of its upper end and at its upper portion. The steering shaft 168 is arranged along the up-down direction. A gear portion 168a configured to mesh with the gear portion 1903 of the relay shaft 190 is arranged at the upper portion of the steering shaft 168. The lower end of the steering shaft 168 is fixed to the vicinity of the from end of the steering plate 170. As shown m FIG. 21, the steering plate 170 has a narrow flat plate shape having its longitudinal direction along the front-rear direction and its short direction along the left-right direction. The rear end of the right tie rod 172 and the rear end of the left tie rod 174 are coupled to the vicinity of the rear end of the steering plate 170. The rear end of the right tie rod 172 is coupled to the steering plate 170 such that the right tie rod 172 is pivotable about two axes orthogonal to the longitudinal direction of the right tie rod 172. The rear end of the left tie rod 174 is coupled to the steering plate 170 such that the left tie rod 174 is pivotable about two axes orthogonal to the longitudinal direction of the left tie rod 174.

As shown in FIG. 22, when the spindle 178 rotates by the rotation of the motor shaft 176a, the rotation of the spindle 178 is transmitted to the relay shaft 190 through the cylindrical worm 186 and the worm wheel 188. As shown in FIG. 24, when the relay shaft 190 pivots, the steering shaft 168 pivots accordingly, and the rear end of the steering plate 170 pivots in the left-right direction. Due to the steering plate 170 pivoting as above, the right tie rod 172 and the left tie rod 174 as shown in FIG. 21 move, and steering of the front wheel unit 12 is thereby performed. In the following description, the steering shaft 168, the steering plate 170, the right tie rod 172, the left tie rod 174, the spindle 178, the torque limiter 181, the cylindrical worm 186, the worm wheel 188, and the relay shaft 190 may collectively be termed a transmission mechanism 169.

In the manual mode, the main control circuit board 44 (see FIG. 4) calculates a steering angle that should be realized in the steering unit 10 based on a detection signal from the rotation angle sensor 88, 132 of the handle unit 8, 108 (see FIGS. 6 and 13). Then, the main control circuit board 44 calculates a rotation angle that should be realized in the steering motor 176 based on the steering angle that should be realized in the steering unit 10, and instructs the drive control circuit board 48 to actuate the steering motor 176. Due to this, the steering angle responsive to the user operation on the handle unit 8, 108 is realized in the steering unit 10.

(Front Wheel Unit 12)

As shown in FIG. 20, the front wheel unit 12 is attached to the front support member 22 at a front lower portion of the base plate 20 of the carriage unit 4 (see FIG. 2). The front wheel unit 12 includes a right front wheel unit 12a and a left front wheel unit 12b. The right front wheel unit 12a includes a right front wheel 192, a right gear housing 194, a right motor housing 196, a right kingpin 198, a right sleeve 200, a right upper arm 202, a right lower arm 204, a right buffer member 206, a right steering plate 208, and a right actual steering angle sensor 210. The left front wheel unit 12b includes a left front wheel 212, a left gear housing 214, a left motor housing 216, a left kingpin 218 (see FIG. 27), a left sleeve 220, a left upper arm 222, a left lower arm 224, a left buffer member 226, a left steering plate 228, and a left actual steering angle sensor 230. In the following description, the right gear housing 194, the right kingpin 198, the right sleeve 200, and the right steering plate 208 may collectively be termed a right holding member 195, and the left gear housing 214, the left kingpin 218, the left sleeve 220, and the left steering plate 228 may collectively be termed a left holding member 215. Further, the right holding member 195, the right upper arm 202, the right lower arm 204, the right buffer member 206, the left holding member 215, the left upper arm 222, the left lower arm 224, the left buffer member 226, and the steering unit 10 may collectively be termed a suspension mechanism 11.

Figure 25:
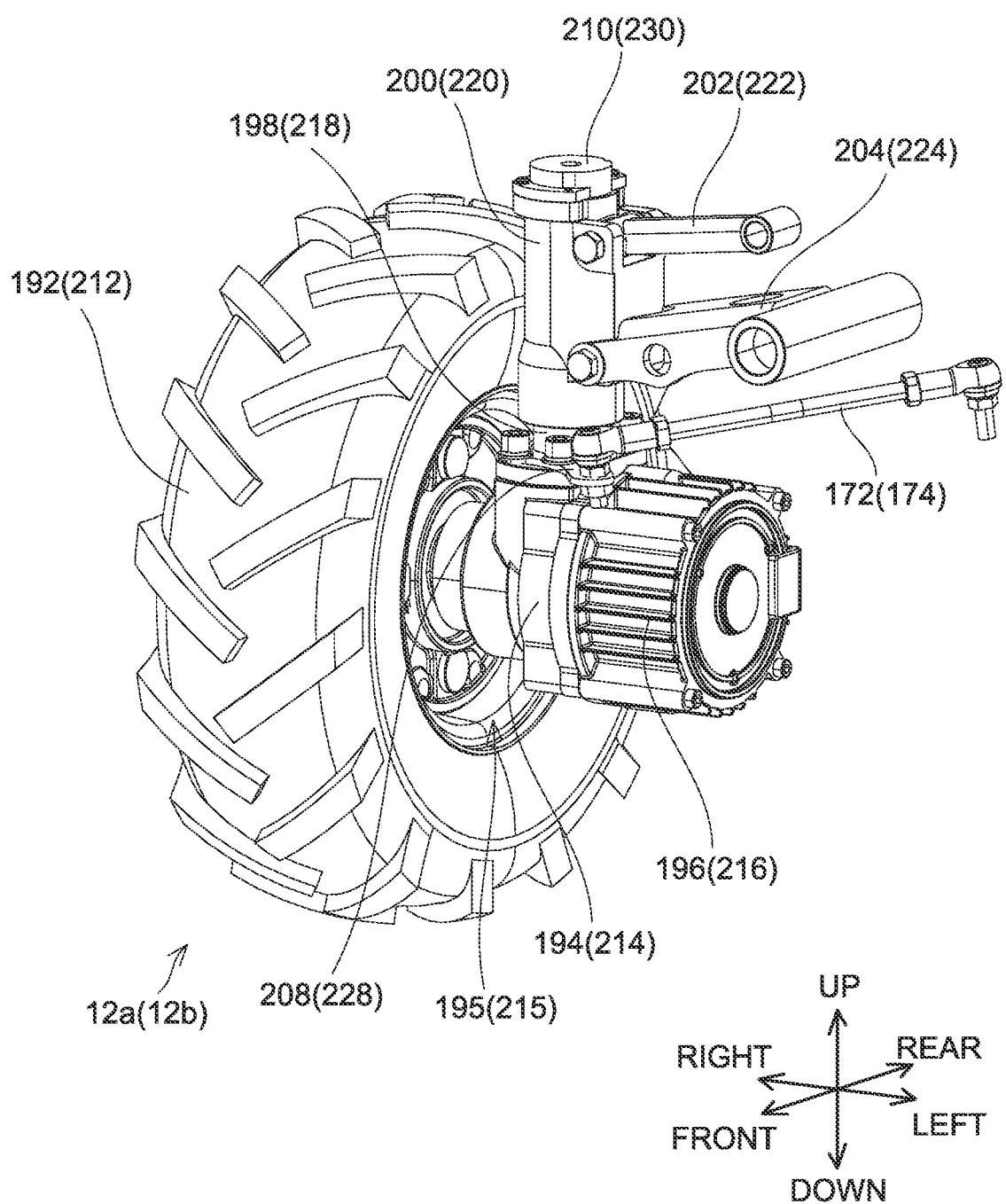
FIG. 25 is a perspective view of a right front wheel unit 12a of the embodiment viewed from the front left upper side.
Figure 26:
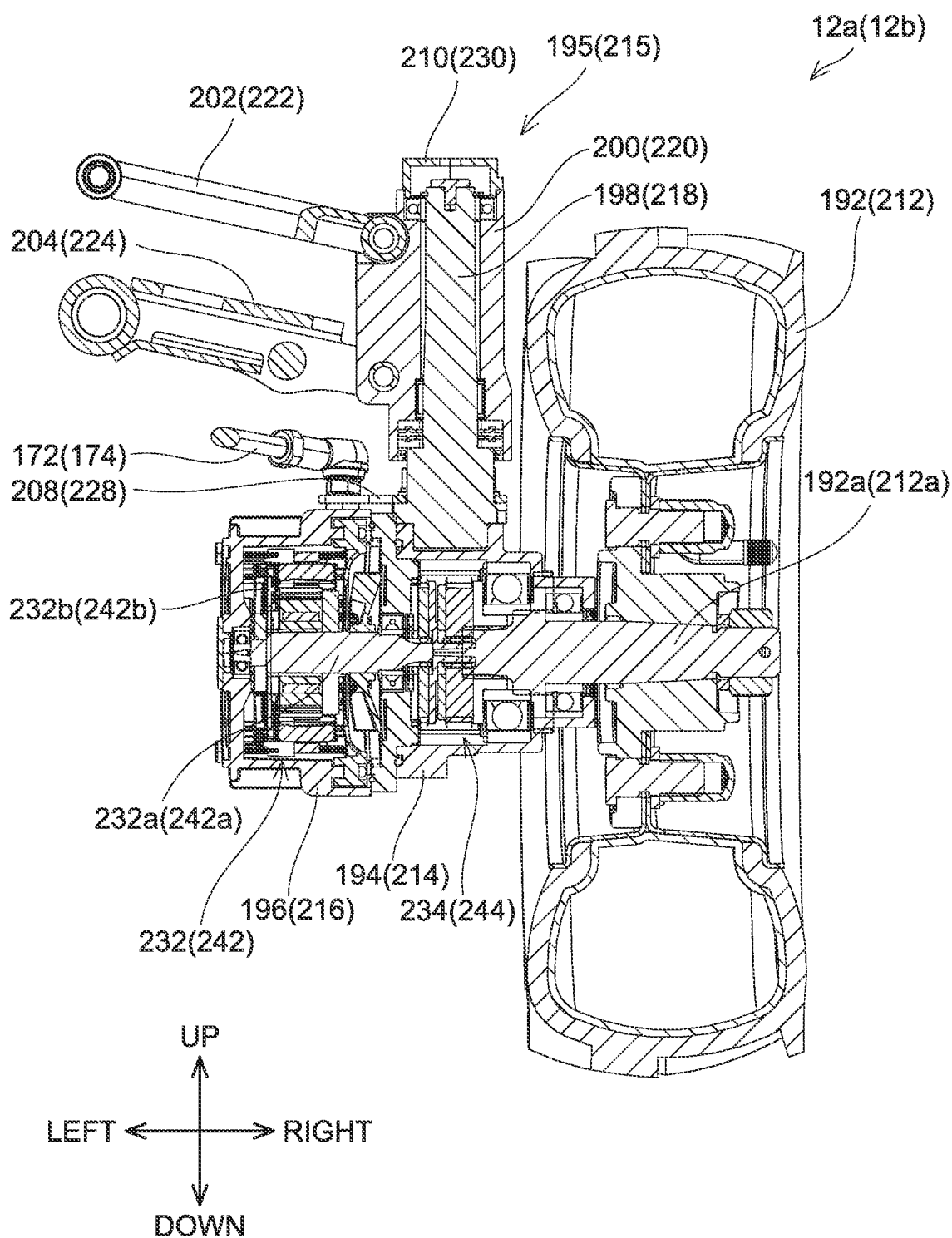
FIG. 26 is a cross-sectional view of the right front wheel unit 12a of the embodiment in a cross section along the left-right and up-down directions.

As shown in FIG. 25, the right gear housing 194 is arranged on the left side of the right front wheel 192. The right motor housing 196 is fixed to a left portion of the right gear housing 194. As shown in FIG. 26, a right front wheel motor 232 is housed inside the right motor housing 196. The right front wheel motor 232 may for example be an inner rotor brushless DC motor. The right front wheel motor 232 is electrically connected to the drive control circuit board 46 (see FIG. 5). The drive control circuit board 46 is configured to control operation of the right front wheel motor 232. The right front wheel motor 232 includes a right front wheel motor shaft 232a extending in the left-right direction and a right from wheel motor rotary speed sensor 232b configured to detect a rotary speed of the right front wheel motor shaft 232a. The right front wheel motor shaft 232a is rotatably held by the right motor housing 196 at the vicinity of its left end, and is rotatably field by the right gear housing 194 at the vicinity of its right end. The right front wheel 192 includes a right front wheel axle 192a extending leftward. The right front wheel axle 192a is rotatably held by the right gear housing 194 at the vicinity of its left end. A planetary gear mechanism 234 is housed inside the right gear housing 194. The planetary gear mechanism 234 is configured to decelerate the rotation of the right front wheel motor shaft 232a and transmit the same to the right front wheel axle 192a. When the right front wheel motor 232 is actuated, the rotation of the right front wheel motor shaft 232a is transmitted to the right front wheel axle 192a through the planetary gear mechanism 234, as a result of which the right front wheel 192 rotates.

The right kingpin 198 is fixed to an upper portion of the right gear housing 194. The right kingpin 198 extends along the up-down direction. An upper portion of the right kingpin 198 enters inside the right sleeve 200. The right kingpin 198 is rotatably held by the right sleeve 200 in the vicinities of the upper and lower ends of the right sleeve 200. As shown in FIG. 25, the right end of the right upper arm 202 is coupled to an upper portion of the right sleeve 200 such that the right upper arm 202 is pivotable about a pivot axis along the front-rear direction. The right end of the right lower arm 204 is coupled to a lower portion of the right sleeve 200 such that the right lower arm 204 is pivotable about a pivot axis along the front-rear direction. As shown in FIG. 20, the left end of the right upper arm 202 is coupled to a right upper coupling portion 22a of the front support member 22 such that the right upper arm 202 is pivotable about a pivot axis along the front-rear direction. The left end of the right lower arm 204 is coupled to a right lower coupling portion 22b of the front support member 22 such that the right lower arm 204 is pivotable about a pivot axis along the front-rear direction. Due to this, the right sleeve 200 is supported by the front support member 22 such dial the right sleeve 200 is movable within a movable range of the right upper arm 202 and the right lower arm 204.

The right buffer member 206 includes a damper 206a and a coil spring 206b. The upper end of the right buffer member 206 is coupled to a front surface of the front support member 22 such that the right buffer member 206 is pivotable about a pivot axis along the front-rear direction. The lower end of the right buffer member 206 is coupled to a front surface of the right lower arm 204 such that the right buffer member 206 is pivotable about a pivot axis along the front-rear direction. Due to this, when the right front wheel 192 moves in the uptown direction relative to the front support member 22, impacts and vibration from the right, front wheel 192 are suppressed from being transmitted to the carriage unit 4 by a damping force of the damper 206a and an elastic restoration force of the coil spring 206b.

As shown in FIG. 25, the right steering plate 208 is fixed to the vicinity of the lower end of the right kingpin 198. The front end of the right tie rod 172 is coupled to the left front end of the right steering plate 208 such that the right tie rod 172 is pivotable about two axes orthogonal to the longitudinal direction of the right tie rod 172. When the right front, wheel unit 12a is viewed from above, the right tie rod 172 intersects with the right upper arm 202 and the right lower arm 204. When the front wheel unit 12 is steered to the right (or left), the rear end of the steering plate 170 (see FIG. 21) moves rightward (or leftward), by which the right steering plate 208, the right kingpin 198, the right gear housing 194, the right motor housing 196, and the right front wheel 192 pivot clockwise tor counterclockwise) relative to the right sleeve 200 with an axial direction of the right kingpin 198 as their pivoting axes in a lop view viewing the right sleeve 200 from above.

The right actual steering angle sensor 210 is fixed to the upper portion of the right sleeve 200. The right actual steering angle sensor 210 is coupled to the upper end of the right kingpin 198. The right actual steering angle sensor 210 is configured to detect a rotation angle of the right kingpin 198 with respect to the right sleeve 200. The right actual steering angle sensor 210 may for example be a potentiometer configured to detect a change in an electric resistance that occurs in accordance with a change in the rotation angle. Alternatively, the right actual steering angle sensor 210 may be a magnetic rotary sensor having a Hall element of which position is fixed with respect to the right sleeve 200 and a permanent magnet of which position is fixed with respect to the right kingpin 198. The right actual steering angle sensor 210 is electrically connected to the main control circuit board 44 (see FIG. 4).

As shown in FIG. 20, the left front wheel unit 12b has a configuration that is in a left-right symmetric relationship with the right front wheel unit 12a. Hereinbelow, the left front wheel unit 12b will be described with reference to FIGS. 25 and 26 showing the right front wheel unit 12a.

As shown in FIG. 25, the left gear housing 214 is arranged on the right of the left front wheel 212. The left motor housing 216 is fixed to a right portion of the left gear housing 214. As shown in FIG. 26, a left front wheel motor 242 is housed inside the left motor housing 216. The left front wheel motor 242 may for example be an inner rotor brushless DC motor. The left front wheel motor 242 is electrically connected to the drive control circuit board 48 (see FIG. 5). The drive control circuit board 48 is configured to control operation of the left front wheel motor 242. The left front wheel motor 242 includes a left front wheel motor shaft 242a extending in the left-right direction and a left front wheel motor rotary speed sensor 242b configured to detect a rotary speed of the left front wheel motor shaft 242a. The left front wheel motor shaft 242a is rotatably held by the left motor housing 216 at the vicinity of its right end, and is rotatably held by the left gear housing 214 at the vicinity of its left end. The left front wheel 212 includes a left axle 212a extending rightward. The left axle 212a is rotatably held by the left gear housing 214 fit the vicinity of its right end. A planetary gear mechanism 244 is housed inside the left gear housing 214. The planetary gear mechanism 244 is configured to decelerate the rotation of the left front wheel motor shaft 242a and transmit the same to the left axle 212a. When the left front wheel motor 242 is actuated, the rotation of the left front wheel motor shaft 242a is transmitted to the left axle 212a through the planetary gear mechanism 244, as a result of which the left front wheel 212 rotates.

The left kingpin 218 is fixed to an upper portion of the left gear housing 214. The left kingpin 218 extends along the up-down direction. An upper portion of the left kingpin 218 enters inside the left sleeve 220. The left kingpin 218 is rotatably held by the left sleeve 220 in the vicinities of upper and lower ends of the left sleeve 220. As shown in FIG. 25, the left end of the left upper arm 222 is coupled to an upper portion of the left sleeve 220 such that the left upper arm 222 is pivotable about a pivot axis along the front-rear direction.

The left end of the left lower arm 224 is coupled to a lower portion of the left sleeve 220 such that the left lower arm 224 is pivotable about a pivot axis along the front-rear direction. As shown in FIG. 20, the right end of the left upper arm 222 is coupled to a left upper coupling portion 22c of the from support member 22 such that the left upper arm 222 is pivotable about a pivot axis along the front-rear direction. The right end of the left lower firm 224 is coupled to a left lower coupling portion 22d of the front support member 22 such that the left lower arm 224 is pivotable about a pivot axis along the front-rear direction. Due to this, the left sleeve 220 is supported by the front support member 22 such that the left sleeve 220 is movable within a movable range of the left upper arm 222 and the left lower arm 224.

The left buffer member 226 includes a damper 226a and a coil spring 226b. The upper end of the left buffer member 226 is coupled to the front surface of the front support member 22 such that the left buffer member 226 is pivotable about a pivot axis along the front-rear direction. The lower end of the left buffer member 226 is coupled to the front surface of the left lower arm 224 such that the left buffer member 226 is pivotable about a pivot axis along the front-rear direction. Due to this, when the left front wheel 212 moves in the up-down direction with respect to the front support member 22, impacts and vibration from the left front wheel 212 are suppressed from being transmitted to the carriage unit 4 by a damping force of the damper 226a and an elastic restoration force of the coil spring 226b.

As shown in FIG. 25, the left steering plate 228 is fixed to the vicinity of the lower end of the left kingpin 218. The front end of the left tie rod 174 is coupled to the right front end of the left steering plate 228 such that the left tie rod 174 is pivotable about two axes orthogonal to the longitudinal direction of the left tie rod 174. When the left front wheel unit 12b is viewed from above, the left tie rod 174 intersects the left upper arm 222 and the left lower arm 224. When the front wheel unit 12 is steered to the right (or left), the rear end of the steering plate 170 (see FIG. 21) moves rightward (or leftward), by which the left steering plate 228, the left kingpin 218, the left gear housing 214, the left motor housing 216, and the left front wheel 212 pivot clockwise (or counterclockwise) relative to the left sleeve 220 with an axial direction of the left kingpin 218 as their pivoting axes in a top view viewing the left sleeve 220 from above.

The left actual steering angle sensor 230 is fixed to the upper portion of the left sleeve 220. The left actual steering angle sensor 230 is coupled to the upper end of the left kingpin 218. The left actual steering angle sensor 230 is configured to detect a rotation angle of the left kingpin 218 with respect to the left sleeve 220. The left actual steering angle sensor 230 may for example be a potentiometer configured to detect a change in an electric resistance that occurs in accordance with a change in the rotation angle. Alternatively, the left actual steering angle sensor 230 may be a magnetic rotary sensor having a Hall element of which position is fixed with respect to the left sleeve 220 and a permanent magnet of which position is fixed with respect to the left kingpin 218. The left actual steering angle sensor 230 is electrically connected to the main control circuit board 44 (see FIG. 4).

Figure 27:
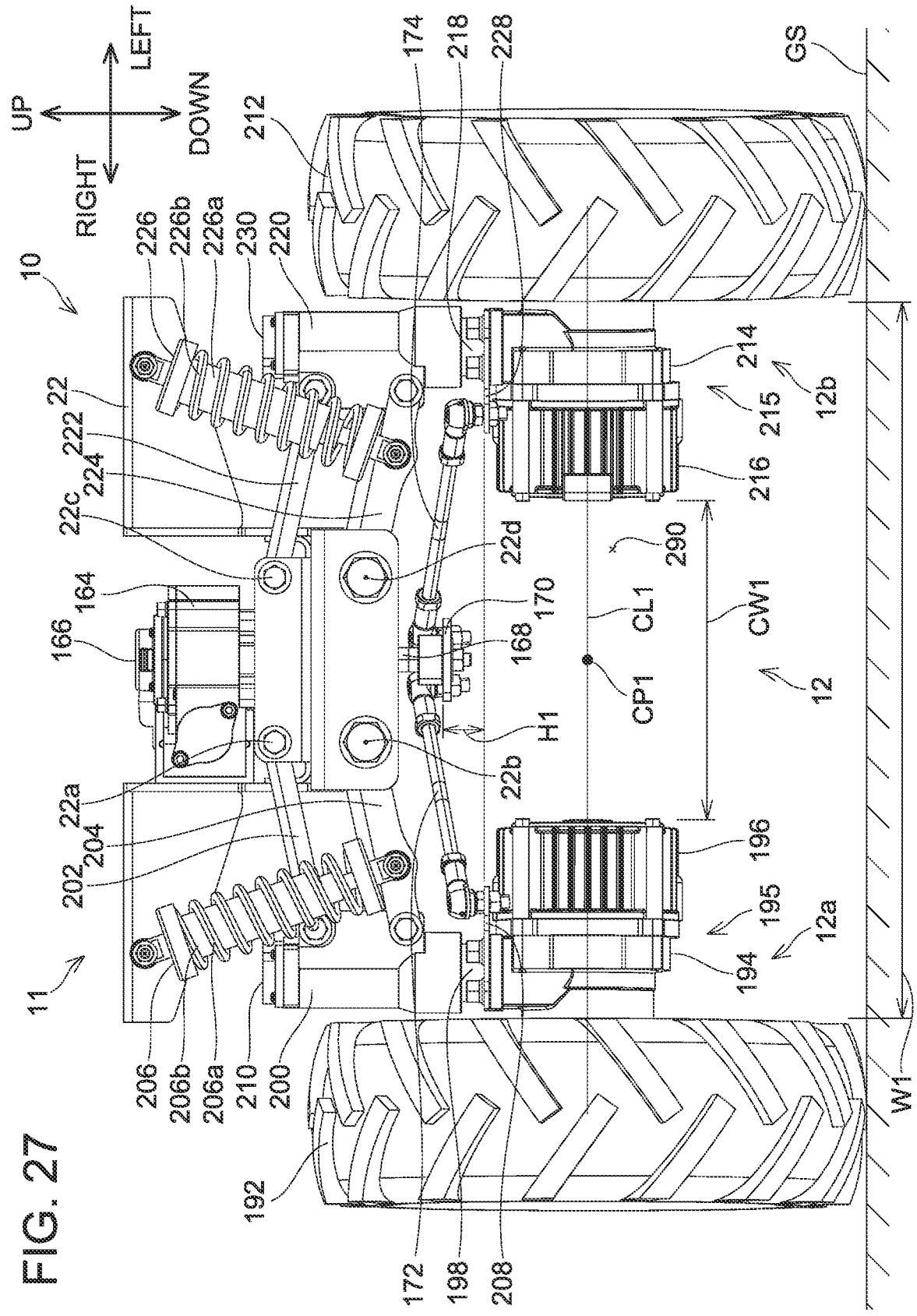
FIG. 27 is a from view of the steering unit 10 and a front wheel unit 12 of the embodiment in a non-sinking state.
Figure 28:
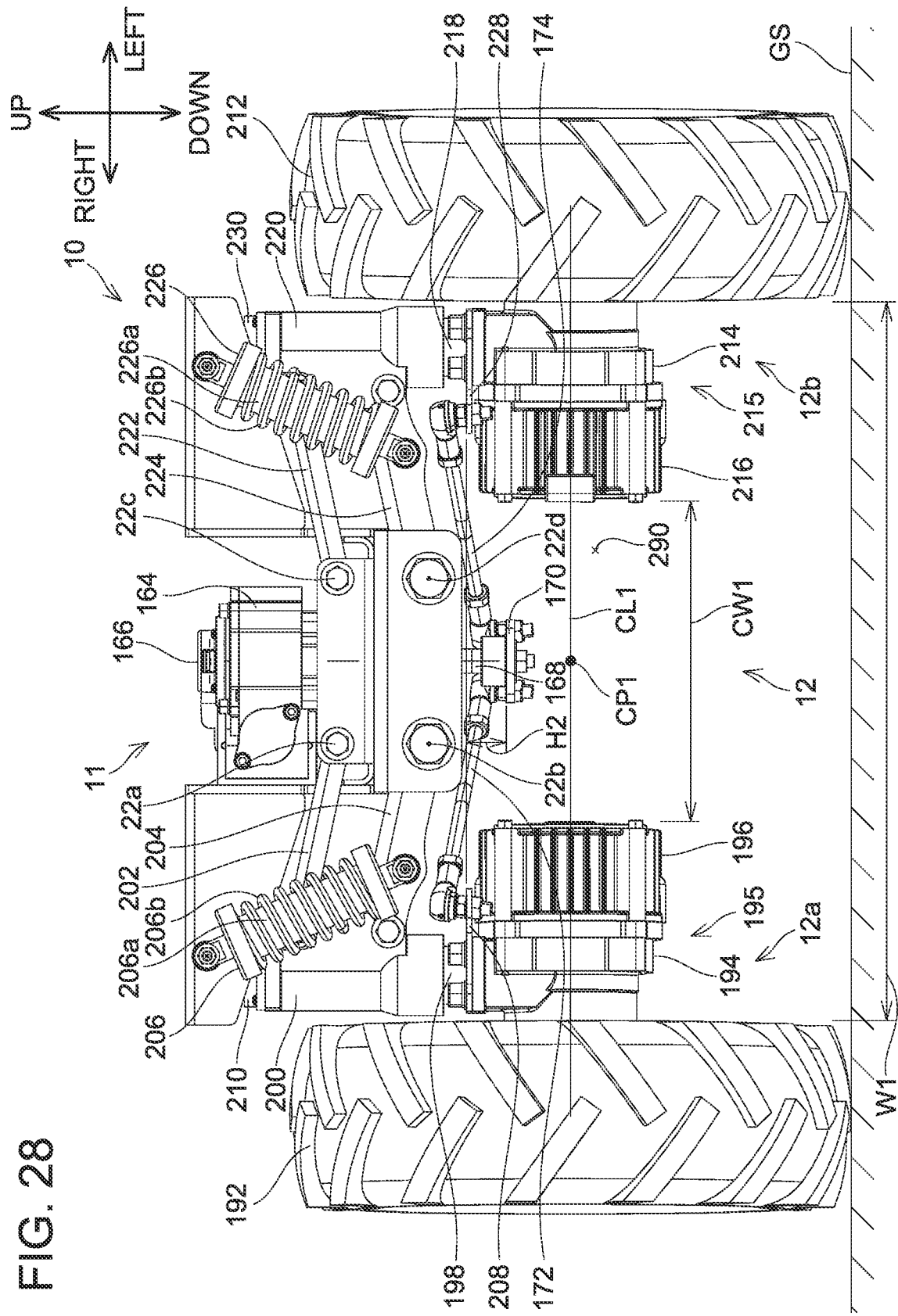
FIG. 28 is a front view of the steering unit 10 and the front wheel unit 12 of the embodiment in a maximum sinking state.
Figure 29:
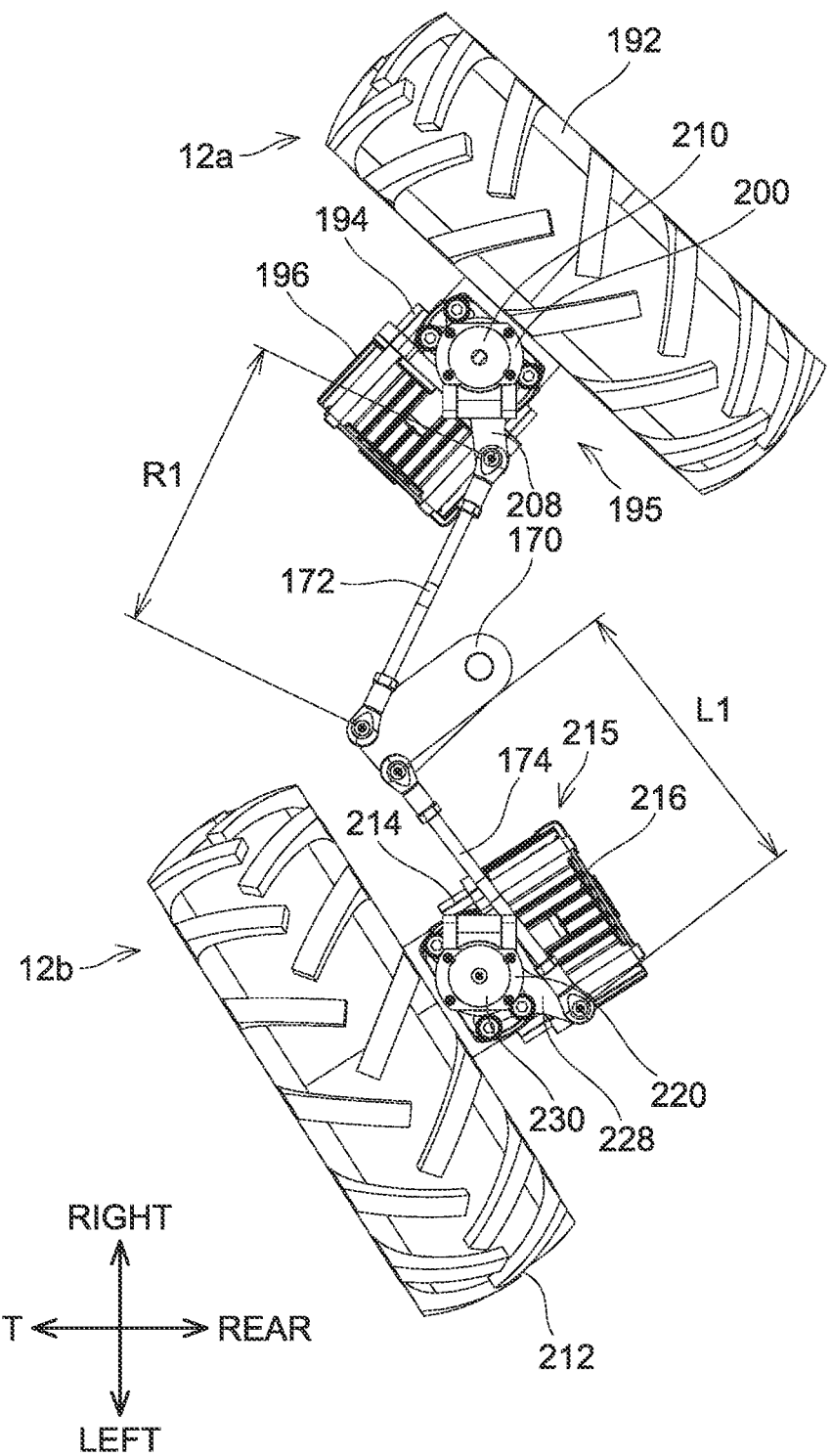
FIG. 29 is a top view of a steering plate 170, a right tie rod 172, a left tie rod 174, the right front wheel unit 12a, and a left front wheel unit 12b in the steering unit 10 and the front wheel unit 12 of the embodiment in a case of steeling to the right in the non-sinking state.
Figure 30:
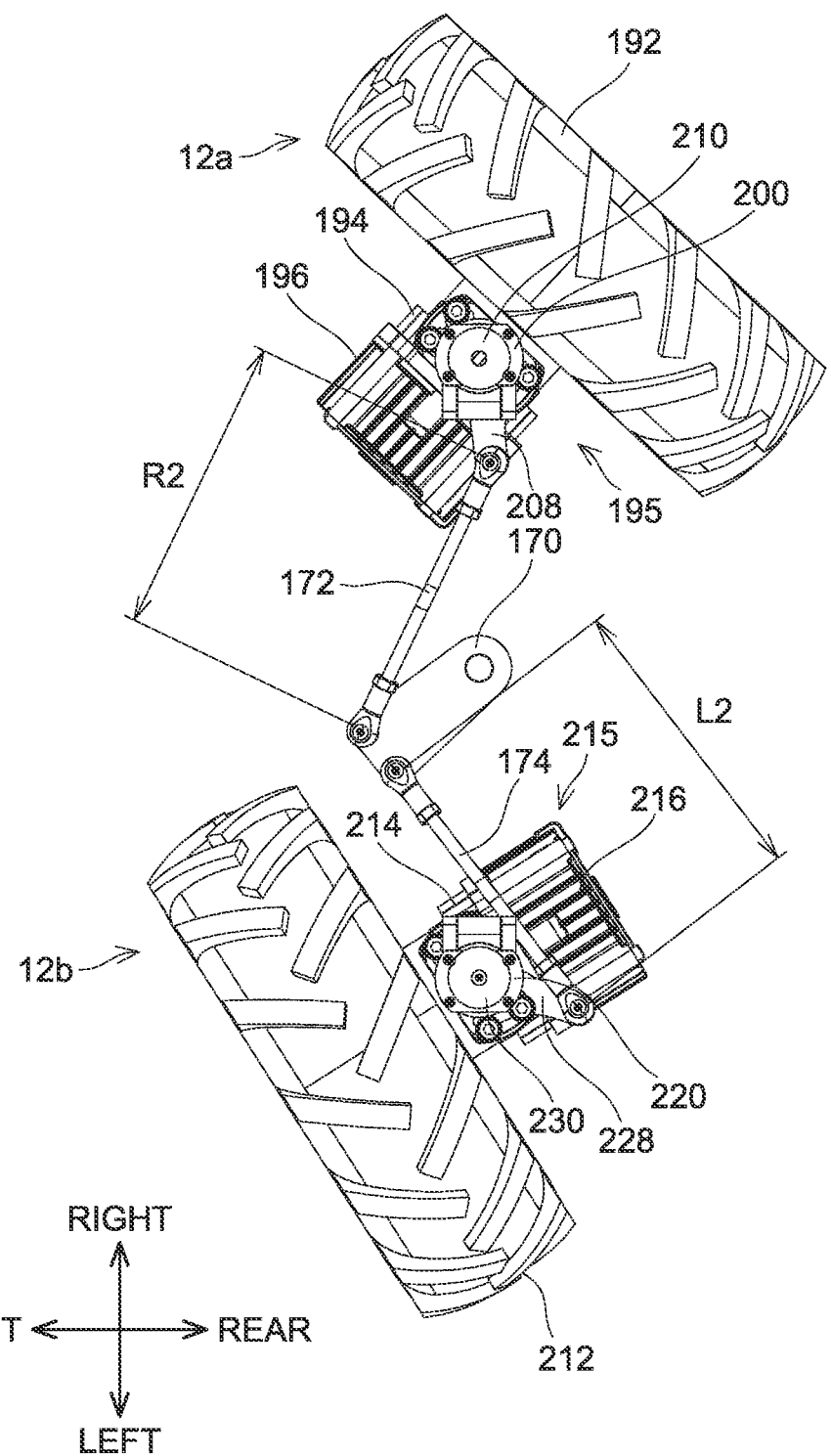
FIG. 30 is a top view of the steering plate 170, the right tie rod 172, the left tie rod 174, the right front wheel unit 12a, and the left front wheel unit 12b in the steering unit 10 and the front wheel unit 12 of the embodiment in a case of steering to the right in the maximum sinking state.

As shown in FIG. 27, in the state in which the carriage unit 4 is not sinking with respect to the right front, wheel 192 and the left front wheel 212 (which will hereinbelow be termed a non-sinking state), the steering plate 170 is positioned higher than the right steering plate 208 and the left steering plate 228 by a first predetermined height H1. Such a non-sinking state is realized tor example when no luggage is placed on the luggage carrier unit 6 and the cart 2 is stopped. Contrary to this, as shown in FIG. 28, in the case in which the carriage unit 4 has sunk to its maximum with respect to the right front wheel 192 and the left front wheel 212 (which will hereinbelow be termed a maximum sinking state), the steering plate 170 is positioned lower than the right steering plate 208 and the left steering plate 228 by a second predetermined height H2. Such a maximum-sinking state is realized for example in the state in which the cart 2 is in use and a maximum load allowed for the right buffer member 206 and the left buffer member 226 is applied to the right buffer member 206 and the left buffer member 226. In the cart 2 of the present embodiment, the first predetermined height H1 and the second predetermined height H2 are substantially equal. In this case, lengths R1, L1 of the right tie rod 172 and the left tie rod 174 projected in a plane perpendicularly intersecting the up-down direction in the non-sinking state as shown in FIG. 29 and lengths R2, L2 of the right tie rod 172 and the left tie rod 174 projected in the plane perpendicularly intersecting the up-down direction as shown in FIG. 30 become substantially equal.

Lengths R, L of the right tie rod 172 and the left lie rod 174 projected in the plane perpendicularly intersecting the up-down direction increase as the carriage unit 4 sink in from the non-sinking state, and reach their maximum when the steering plate 170 come to the same height as the right steering plate 208 and the left steering plate 228. After this, as the carriage unit 4 further sink in toward the maximum-sinking state, the steering plate 170 sink lower than the right steering plate 208 and the left steering plate 228, and the lengths R, L of the right tie rod 172 and the left tie rod 174 projected in the plane perpendicularly intersecting the up-down direction decrease. In the cart 2 of the present embodiment, since the lengths R1, L1 in the non-sinking state are substantially the same as the lengths R2, L2 in the maximum-sinking state, a variation range of the lengths R, L of the right tie rod 172 and the left tie rod 174 projected in the plane perpendicularly intersecting the up-down direction can be reduced.

(Rear Wheel Unit 14)

Figure 31:
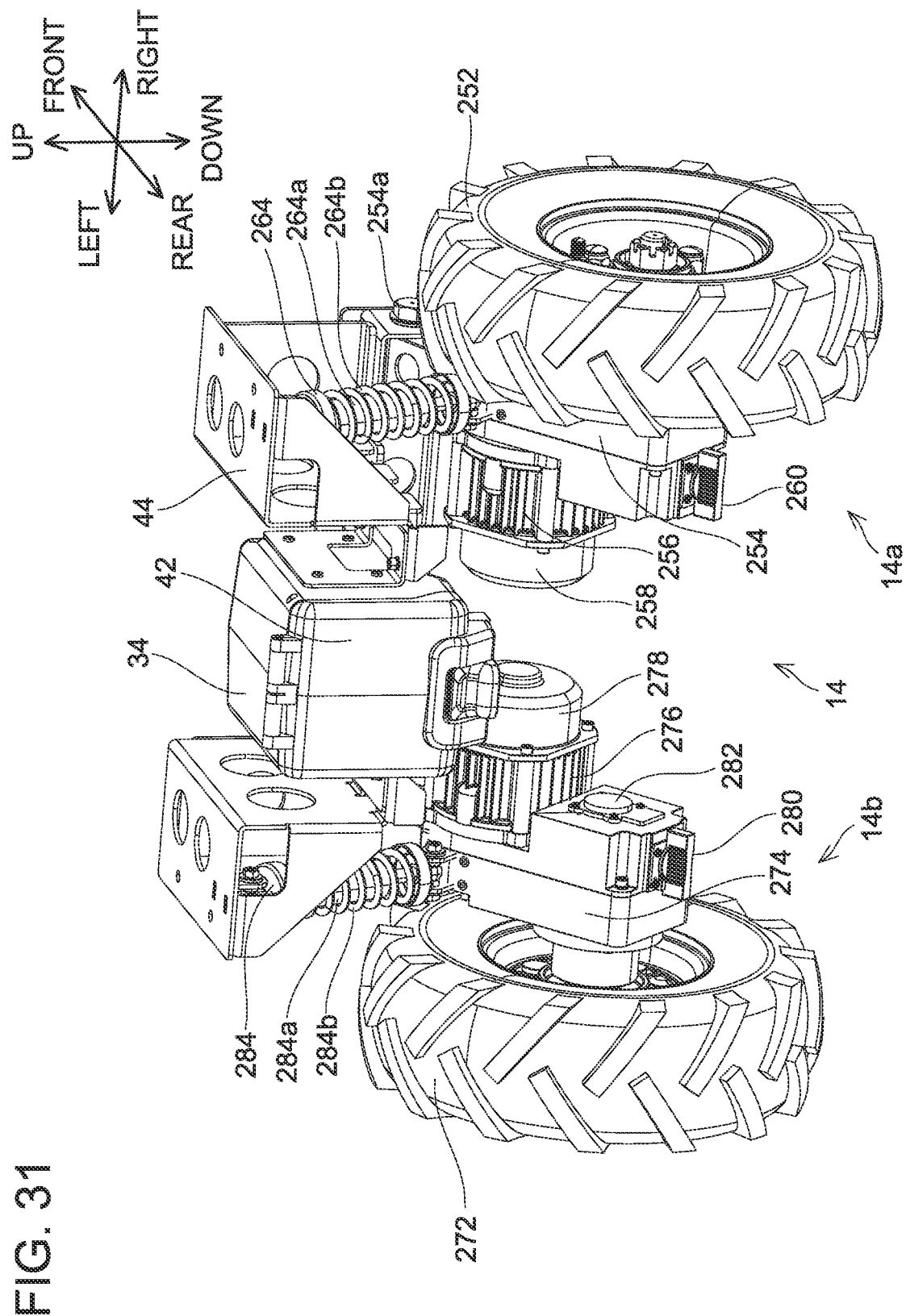
FIG. 31 is a perspective view of a rear wheel unit 14 of the embodiment viewed from the rear right upper side.

As shown in FIG. 31, the rear wheel unit 14 is attached to the rear support member 24 at a rear lower portion of the base plate 20 of the carriage unit A (see FIG. 2). The rear wheel unit 14 includes a right rear wheel unit 14a and a left rear wheel unit 14b. The rigid rear wheel unit 14a includes a rigid rear wheel 252, a right gear housing 254, a right motor housing 256, a right brake housing 258, a right clutch lever 260, a right rear wheel rotary speed sensor 262 (see FIG. 32), and a right buffer member 264. The left rear wheel unit 14b includes a left rear wheel 272, a left gear housing 274, a left motor housing 276, a left brake housing 278, a left clutch lever 280, a left rear wheel rotary speed sensor 282, and a left buffer member 284.

Figure 32:
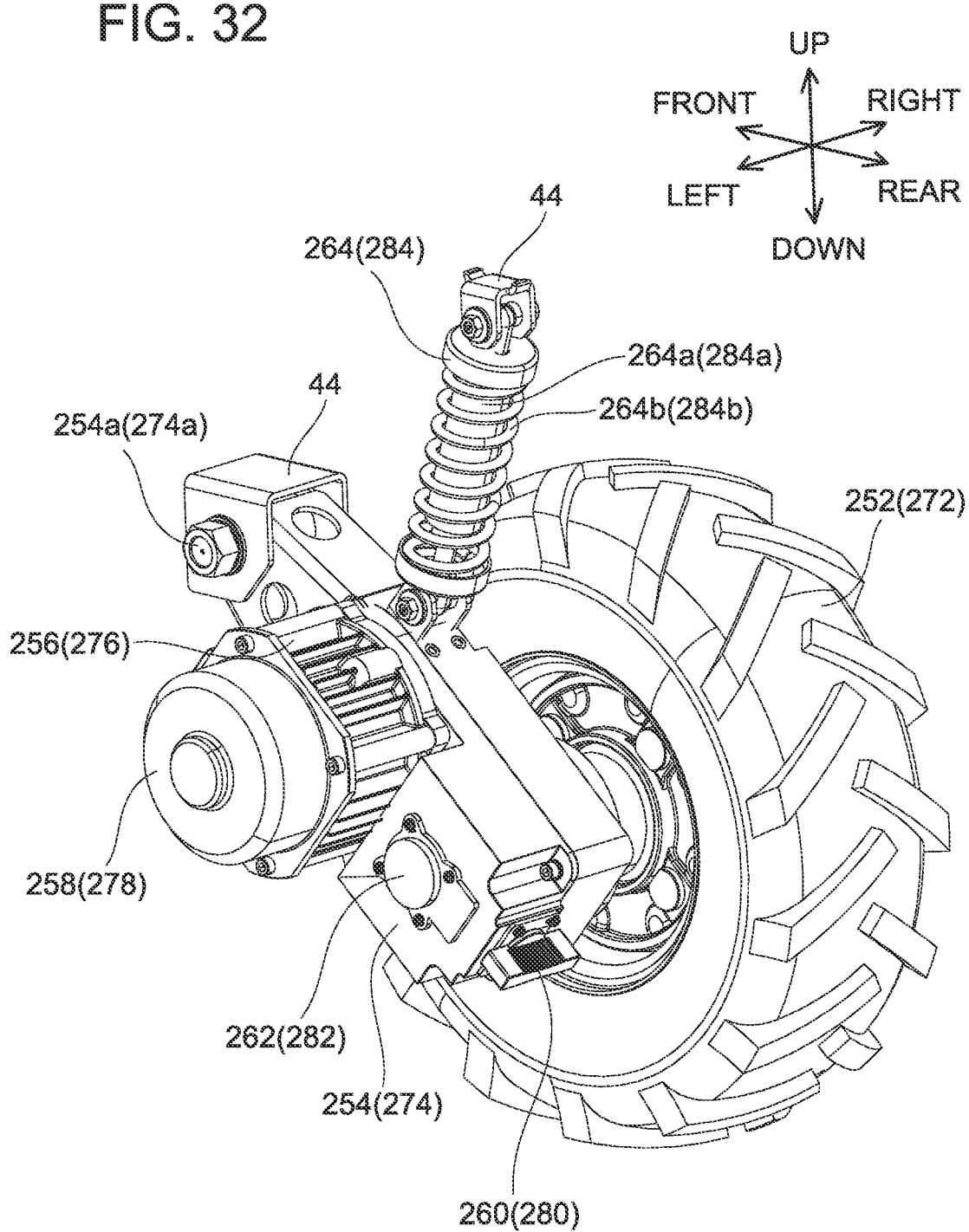
FIG. 32 is a perspective view of a right rear wheel unit 14a of the embodiment viewed from the rear left upper side.

As shown in FIG. 32, the right gear housing 254 is arranged on the left side of the right rear wheel 252 and rotatably holds a right rear wheel axle (not shown) of the right rear wheel 252. The right gear housing 254 extends upward and frontward from the right rear wheel axle. The right motor housing 256 is fixed to a front upper left portion of the right gear housing 254. The right brake housing 258 is fixed to a left portion of the right motor housing 256. A right rear wheel motor (not shown) is housed in the right motor housing 256. The right rear wheel motor may for example be an inner rotor brushless DC motor. The right rear wheel motor is electrically connected to the drive control circuit board 46 (see FIG. 5). The drive control circuit board 46 is configured to control operation of the right rear wheel motor. The right tear wheel motor includes a right rear wheel motor shaft (not shown) extending in the left-right direction and a right rear wheel motor rotary speed sensor (not shown) configured to detect a rotary speed of the right rear wheel motor shaft. A right mar wheel electromagnetic brake (not shown) is housed in the right brake housing 258. The right rear wheel electromagnetic brake is coupled to the right rear wheel motor shaft. The right rear wheel electromagnetic brake is configured to switch between a state allowing rotation of the right rear wheel motor shaft and a state prohibiting the same. The right rear wheel electromagnetic brake is electrically connected to the drive control circuit board 46 (see FIG. 5). The drive control circuit board 46 is configured to control operation of the right rear wheel electromagnetic brake. In the parking mode, the right rear wheel electromagnetic broke is maintained in the state prohibiting rotation of the right rear wheel motor shaft.

A spur gear mechanism (not shown) and a clutch mechanism (not shown) are housed in the right gear housing 254. The spur gear mechanism is configured to decelerate the rotation of the right rear wheel motor shaft and transmit the same to the right rear wheel axle. When the right tear wheel motor is actuated, the rotation of the right rear wheel motor shaft is transmitted to the right rear wheel axle through the spur gear mechanism, and the sight rear wheel 252 thereby rotates. The clutch mechanism is configured to switch between a state allowing transmission of the rotation from the right rear wheel motor shaft to the right rear wheel axle and a state prohibiting, the same in response to an operation performed on the right clutch lever 260. Due to this, by switching the clutch mechanism to the state prohibiting the transmission of the rotation from the right rear wheel motor shaft to the right rear wheel axle when the right rear wheel electromagnetic brake prohibits the rotation of the right rear wheel motor shaft, the right rear wheel 252 can be suppressed from locking. The right rear wheel rotary speed sensor 262 is fixed to the rear lower left portion of the right gear housing 254. The right rear wheel rotary speed sensor 262 is coupled to the left end of the right rear wheel axle. The right rear wheel rotary speed sensor 262 is configured to detect a rotary speed of the right rear wheel axle with respect to the right gear housing 254. The right rear wheel rotary speed sensor 262 is electrically connected to the main control circuit board 44 (see FIG. 4).

A coupling portion 254a is arranged in the vicinity of the front upper end of the right gear housing 254. The coupling portion 254a is coupled to the rear support member 24 such that the coupling portion 254a is pivotable about a pivot axis along the left-right direction. The right buffer member 264 includes a damper 264a and a coil spring 264b. The upper end of the right buffer member 264 is coupled to the rear support member 24 at a portion rearward and upward from the coupling portion 254a such that the right buffer member 264 is pivotable about a pivot axis along the left-right direction. The lower end of the right buffer member 264 is coupled to a rear upper surface of the right gear housing 254 such that the right buffer member 264 is pivotable about a pivot axis along the left-right direction. Due to this, when the right rear wheel 252 moves in the up-down direction relative to the rear support member 24, impacts and vibration from the right, rear wheel 252 are suppressed from being transmitted to the carriage unit 4 by a damping force of the damper 264a and an elastic restoration force of the coil spring 264b.

As shown in FIG. 31, the left rear wheel unit 14b includes a configuration that is in a left-right symmetric relationship with the right rear wheel unit 14a. Hereinbelow, the left rear wheel unit 14b will be described with reference to FIG. 32 showing the right rear wheel unit 14a.

As shown in FIG. 32, the left gear housing 274 is arranged on the right side of the left rear wheel 272 and rotatably holds n left rear wheel axle (not shown) of the left rear wheel 272. The left gear housing 274 extends upward and frontward from the left rear wheel axle. The left motor housing 276 is fixed to a front upper right portion of the left gear housing 274. The left brake housing 278 is fixed to a right portion of the left motor housing 276. A left rear wheel motor (not shown) is housed in the left motor housing 276. The left rear wired motor may for example be an inner rotor brushless DC motor. The left rear wheel motor is electrically connected to the drive control circuit board 48 (see FIG. 5). The drive control circuit board 48 is configured to control operation of the left rear wheel motor. The left rear wheel motor includes a left rear wheel motor shaft (not shown) extending in the left-right direction and a left rear wheel motor rotary speed sensor (not shown) configured to detect a rotary speed of the left rear wheel motor shaft. A left rear wheel electromagnetic brake (not shown) is housed in the left brake housing 278. The left rear wheel electromagnetic brake is coupled to the left rear wheel motor shaft. The left rear wheel electromagnetic brake is configured to switch between a state allowing rotation of the left rear wheel motor shaft and a shite prohibiting the same. The left rear wheel electromagnetic brake is electrically connected to the drive control circuit board 48 (see FIG. 5). The drive control circuit board 48 is configured to control operations of the left rear wheel electromagnetic brake. In the parking mode, the left rear wheel electromagnetic brake is maintained in the state prohibiting rotation of the left rear wheel motor shaft.

A spur gear mechanism (not shown) and a clutch mechanism (not shown) are housed in the left gear housing 274. The spur gear mechanism is configured to decelerate the rotation of the left rear wheel motor shaft and transmits the same to the left rear wheel axle. When the left rear wheel motor is actuated, the rotation of the left rear wheel motor shaft is transmitted to the left rear wheel axle through the spur gear mechanism, and the left rear wheel 272 thereby rotates. The clutch mechanism is configured to switch between a state allowing transmission of the rotation from the left rear wheel motor shaft to the left rear wheel axle and a state prohibiting the same in response to an operation performed on the left clutch lever 280. Due to this, by switching the clutch mechanism to the state prohibiting the transmission of the rotation from the left rear wheel motor shaft to the left rear wheel axle when the left rear wheel electromagnetic brake prohibits the rotation of the left rear wheel motor shaft, the left rear wheel 272 can be suppressed from locking. The left rear wheel rotary speed sensor 282 is fixed to a rear lower right portion of the left gear housing 274. The left rear wheel rotary speed sensor 282 is coupled to the right end of the left rear wheel axle. The left rear wheel rotary speed sensor 282 is configured to detect a rotary speed of the left rear wheel axle with respect to the left gear housing 274. The left rear wheel rotary speed sensor 282 is electrically connected to the main control circuit board 44 (see FIG. 4).

A coupling portion 274a is arranged in the vicinity of the front upper end of the left gear housing 274. The coupling portion 274a is coupled to the rear support member 24 such that the coupling portion 274a is pivotable about a pivot axis along the left-right direction. The left buffer member 284 includes a damper 284a and a coil spring 284b. The upper end of the left buffer member 284 is coupled to the rear support member 24 at a portion rearward and upward from the coupling portion 271a such that the left buffer member 284 is pivotable about a pivot axis along the left-right direction. The lower end of the left buffer member 284 is coupled to a rear upper surface of the left gear housing 274 so that the left, buffer member 284 is pivotable about a pivot axis along the left-right direction. Due to this, when the left rear wheel 272 moves in the up-down direction relative to the rear support member 24, impacts and vibration from the left rear wheel 272 are suppressed from being transmitted to the carriage unit 4 by a damping force of the damper 284a and an elastic restoration force of the coil spring 284b.

The main control circuit board 44 (see FIG. 4) is configured to calculate an actual travelling route of the cart 2 based on a steering angle obtained from a detection signal of the steering angle sensor 166 of the steering unit 10, rotary speeds of the right front w heel motor 232 and the left front wheel motor 242 obtained from detection signals from the right from wheel motor rotary speed sensor 232b and the left front wheel motor rotary speed sensor 242b of the front wheel unit 12, and rotary speeds of the right rear wheel motor and the left rear wheel motor obtained from detection signals from the right rear wheel motor rotary speed sensor and the left rear wheel motor rotary speed sensor of the rear wheel unit 14.

Figure 33:
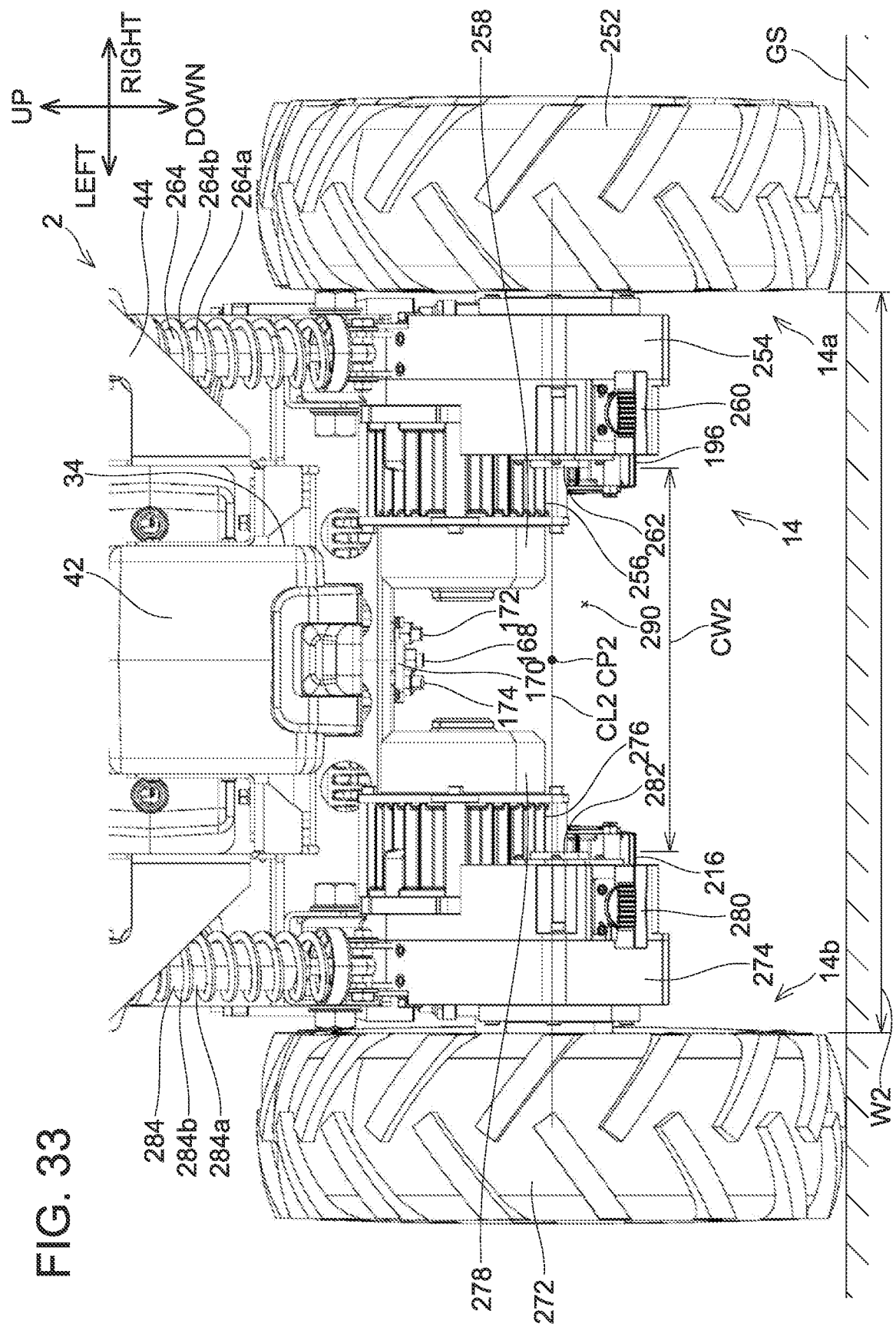
FIG. 33 is a rear view of a lower portion of the cart 2 of the embodiment.

As shown in FIG. 33, a lower space 290 extending upward from the ground GS is defined at the center below the carriage unit 4 as the cart 2 is viewed from behind. As shown in FIGS. 27 and 28, the lower space 290 includes a midpoint CP1 of a straight line CL1 connecting the center of the right front wheel 192 and the center of the left front wheel 212. The lower space 290 has a width CW1 between the right front wheel 192 and the left front wheel 212. The width CW1 is ⅓ or more of a distance W1 between a left side surface of the right front wheel 192 and a right ride surface of the left front wheel 212. Further, as shown in FIG. 33, the lower space 290 includes a midpoint CP2 of a straight line CL2 connecting the center of the right rear wheel 252 and the center of the left rear wheel 272. The lower space 290 has a width CW2 between the right rear wheel 252 and the left rear wheel 272. The width CW2 is ⅓ or more of a distance W2 between a left side surface of the right rear wheel 252 and a right side surface of the left rear wheel 272. By configuring as such, even when an obstacle is on the ground GS, the steering unit 10, the front wheel unit 12, and the rear wheel unit 14 can be suppressed from colliding with such an obstacle (Variants)

In the above embodiment, the right from wheel motor 232, the left front wheel motor 242, the right rear wheel motor, and the left rear wheel motor may be in-wheel motors (not shown) that are respectively incorporated in the right front wheel 192, the left front wheel 212, the right rear wheel 252, and the left rear wheel 272.

In the above embodiment, the steering motor 176, the right front wheel motor 232, the left front wheel motor 242, the right rear wheel motor, and the left rear wheel motor may be outer rotor brushless DC motors, may be brushed DC motors, may be AC motors, ox may be other types of motors.

In the above embodiment, the handle unit 8 shown in FIG. 6 may include a cover member (not shown) covering the movable cam member 90, the fixed cam member 92, the coil spring 94, and a part of the handle shaft 84. In this case, the fixed member 82 may constitute a part of the cover member.

In the above embodiment, the handle units 8, 108 shown in FIGS. 6 and 13 may each include another type of elastic member instead of the coil spring 94, 136. Further, the handle units 8, 108 may each include a damper (not shown) configured to apply a damping force on pivoting of the handle shaft 84, 126.

As above, in one or more embodiments, the cart 2 comprises: the carriage unit 4 (an example of the carriage); the right front wheel 192 and the left front wheel 212 (examples of the wheel) supported by the carriage unit 4 and touching ground; the right holding member 195 and the left holding member 215 (examples of the holding member) rotatably supported by the carriage unit 4 about the steering axis and rotatably supporting the right front wheel 192 find the left front wheel 212 about the rotation axis; the steering handle 73, 113 to be gripped by a user; the rotation angle sensor 88, 132 (examples of the input sensor) configured to detect an operation on the steering handle 73, 113 by the user; the steering motor 176 configured to be actuated in response to the operation by the user detected by the rotation angle sensor 88, 132; and the transmission mechanism 169 connecting, the steering motor 176 and the right holding member 195, the left holding member 215 and configured to rotate the right holding member 195 and the left holding member 215 about the steering axis in response to actuation of the steering motor 176. The steering handle 73, 113 and the transmission mechanism 169 are mechanically separated. The transmission mechanism 169 includes the torque limiter 181 interposed between the steering motor 176 and the right holding member 195 and between the steering motor 176 and the left holding member 215.

According to the above configuration, since the transmission mechanism 169 includes the torque limiter 181 interposed between the steering motor 176 and the right holding member 195 and between the steering motor 176 and the left holding member 215, the transmission mechanism 169 can be suppressed from breaking even when an overload is applied from the steering motor 176.

In one or more embodiments, the transmission mechanism 169 further includes the steering angle sensor 166 arranged between the steering motor 176 and the right holding member 195 and between the steering motor 176 and the left holding member 215 and configured to detect the steering angle in the transmission mechanism 169. The torque limiter 181 may be arranged between the steering motor 176 and the steering angle sensor 166.

According to the above configuration, since the torque limiter 181 is interposed between the steering motor 176 and the steering angle sensor 166, a difference between a steering angle detected using the steering angle sensor 166 and an actual steering angle in the transmission mechanism 169 can be reduced even when transmission of power in the transmission mechanism 169 is blocked due to actuation of the torque limiter 181.

In one or more embodiments, the transmission mechanism 169 further includes: the steering shaft 168 configured to rotate with respect to the carriage unit 4 and configured to rotate in response to the actuation of the steering motor 176; the steering plate 170 (example of the link member) fixed to the steering shaft 168; and the right tie rod 172 and the left tie rod 174 (examples of the tie rod) including one ends rotatably attached to the steering plate 170 and the other ends rotatably attached to the right holding member 195 and the left holding member 215. The steering angle sensor 166 is arranged between the steering motor 176 and the steering shaft 168.

According to the above configuration, the torque limiter 181 and the steering angle sensor 166 can be arranged at positions away from the right from wheel 192, the left front wheel 212, the right holding member 195 and the left holding member 215.

In one or more embodiments, the transmission mechanism 169 further includes the relay shaft 190 configured to rotate with respect to the carriage unit 4 and interposed between the steering motor 176 and the steering shaft 168. The relay shaft 190 includes the gear portion 190a (example of the first gear portion). The steering shaft 168 includes the gear portion 168a (example of the second gear portion) meshing with the gear portion 190a. The steering angle sensor 166 is attached to the relay shaft 190.

According to the above configuration, steering angle detection by the steering angle sensor 166 can be performed with higher precision.

In one or more embodiments, the transmission mechanism 169 further includes the spindle 178 configured to rotate with respect to the carriage unit 4 and configured to rotate in response to the actuation of the steering motor 176. The spindle 178 includes the cylindrical worm 186 (example of the cylindrical worm part). The relay shaft 190 further includes the worm wheel 188 (example of the worm wheel part) meshing with the cylindrical worm 186.

According to the above configuration, rotation is transmitted from the spindle 178 to the relay shaft 190 although it is not transmitted from the relay shaft 190 to the spindle 178. For example, even when the right holding member 195 and/or the left holding member 215 receives torque about the steering axis due to an external force, this torque can be suppressed from being transmitted to the steering motor 176 through the transmission mechanism 169.

In one or more embodiments, the steering motor 176 includes the motor shaft 176a configured to rotate in response to the actuation of the steering motor 176. The motor shaft 176a includes the gear portion 176b (example of the third gear portion). The torque limiter 181 includes: the cam wheel 180 fixed to the spindle 178; the movable gear 182 configured to move with respect to the spindle 178 along the axial direction of the spindle 178 and meshing with the gear portion 176b; and the coil spring 184 configured to bias the movable gear 182 with respect to the spindle 178 toward the cam wheel 180. The cam wheel 180 includes the cam grooves 180a. The movable gear 182 includes the cam protrusions 182c corresponding to the cam grooves 180a.

According to the above configuration, the torque limiter 181 can be realized with a simple configuration.

What is claimed is:

1. A cart comprising:
   a carriage;
   a wheel supported by the carriage and touching ground;
   a holding member rotatably supported by the carriage about a steering axis and rotatably supporting the wheel about a rotation axis;
   a steering handle to be gripped by a user;
   an input sensor configured to detect an operation on the steering handle by the user;
   a steering motor configured to be actuated in response to the operation by the user detected by the input sensor; and
   a transmission mechanism connecting the steering motor and the holding member and configured to rotate the holding member about the steering axis m response to actuation of the steering motor, wherein
   the steering handle and the transmission mechanism axe mechanically separated, and
   the transmission mechanism includes a torque limiter interposed between the steering motor and the holding member.

2. The cart according to claim 1, wherein the transmission mechanism further includes a steering angle sensor arranged between the steering motor and the holding member and configured to detect a steering angle in the transmission mechanism, and
   the torque limiter is arranged between the steering motor and the steering angle sensor.

3. The cart according to claim 2, wherein the transmission mechanism further includes:
   a steering shaft configured to rotate with respect to the carriage and configured to rotate in response to the actuation of the steering motor;
   a link member fixed to the steering shaft; and
   a tie rod including one end rotatably attached to the link member and the other end rotatably attached to the holding member, wherein
   the steering angle sensor is arranged between the steering motor and the steering shaft.

4. The cart according to claim 3, wherein the transmission mechanism further includes a relay shall configured to rotate with respect to the carriage and interposed between the steering motor and the steering shaft,
   the relay shaft includes a first gear portion,
   the steering shaft includes a second gear portion meshing with the first gear portion, and
   the steering angle sensor is attached to the relay shaft.

5. The cart according to claim 4, wherein the transmission mechanism further includes a spindle configured to rotate with respect to the carriage and configured to rotate in response to the actuation of the steering motor,
   the spindle includes a cylindrical worm part, and
   the relay shaft further includes a worm wheel part meshing with the cylindrical worm part.

6. The cart according to claim 5, wherein the steering motor includes a motor shaft configured to rotate in response to the actuation of the steering motor,
   the motor shaft includes a third gear portion,
   the torque limiter includes:
   a cam wheel fixed to the spindle;
   a movable gear configured to move with respect to the spindle along an axial direction of the spindle and meshing, with the third gear portion; and
   a coil spring configured to bias the movable gear with respect to the spindle toward the cam wheel,
   the cam wheel includes a cam groove, and
   the movable gear includes a cam protrusion corresponding to the cam groove.

* * * * *